(12) United States Patent
Lai et al.

(10) Patent No.: US 11,034,107 B2
(45) Date of Patent: Jun. 15, 2021

(54) CONTACT LENS WITH SURFACE MODIFICATION AND THE METHOD FOR ITS PREPARATION

(71) Applicant: PEGAVISION CORPORATION, Taoyuan (TW)

(72) Inventors: Yu-Chin Lai, Taoyuan (TW);
Ming-Nan Lin, Taoyuan (TW);
Min-Tzung Yeh, Taoyuan (TW);
Ya-Hsuan Liao, Taoyuan (TW)

(73) Assignee: PEGAVISION CORPORATION, Taoyuan (TW)

( * ) Notice: Subject to any disclaimer, the term of this patent is extended or adjusted under 35 U.S.C. 154(b) by 355 days.

(21) Appl. No.: 15/896,084

(22) Filed: Feb. 14, 2018

(65) Prior Publication Data
US 2019/0009482 A1  Jan. 10, 2019

(30) Foreign Application Priority Data
Jul. 5, 2017 (TW) ................. 106122592

(51) Int. Cl.
*B29D 11/00* (2006.01)
*G02B 1/04* (2006.01)
*G02C 7/04* (2006.01)

(52) U.S. Cl.
CPC .. *B29D 11/00067* (2013.01); *B29D 11/00038* (2013.01); *B29D 11/00076* (2013.01); *B29D 11/00096* (2013.01); *G02B 1/043* (2013.01); *B29D 11/00134* (2013.01); *B29D 11/00865* (2013.01); *G02C 7/049* (2013.01)

(58) Field of Classification Search
CPC ................................. G02B 1/043
See application file for complete search history.

(56) References Cited

U.S. PATENT DOCUMENTS

| 6,440,571 B1* | 8/2002 | Valint, Jr. | A61L 27/34 |
| | | | 428/447 |
| 6,586,038 B1 | 7/2003 | Chabrecek et al. | |
| 8,529,057 B2 | 9/2013 | Qiu et al. | |
| 8,944,592 B2 | 2/2015 | Qiu et al. | |
| 9,310,627 B2 | 4/2016 | Havenstrite et al. | |
| 9,395,468 B2 | 7/2016 | Havenstrite et al. | |
| 2008/0174035 A1* | 7/2008 | Winterton | B29D 11/00038 |
| | | | 264/1.36 |
| 2009/0103045 A1* | 4/2009 | Lai | G02B 1/043 |
| | | | 351/159.33 |
| 2016/0223836 A1 | 8/2016 | Havenstrite et al. | |

FOREIGN PATENT DOCUMENTS

| CN | 1906222 A | 1/2007 |
| CN | 106715101 A | 5/2017 |
| EP | 0362137 A2 | 4/1990 |
| EP | 0865326 A1 | 9/1998 |
| JP | H02124523 A | 5/1990 |
| JP | 2000503044 A | 3/2000 |
| TW | 200535153 | 11/2005 |

OTHER PUBLICATIONS

Michael Leonard Read et al., "Dynamic Contact Angle Analysis of Silicone Hydrogel Contact Lenses", Journal of Biomaterials Applications, Mar. 10, 2010.

Lily Cheng et al., "Wettability of Silicone-Hydrogel Contact Lenses in the Presence of Tear-Film Components", vol. 28, No. 2, Current Eye Research 2004, pp. 93-108.

* cited by examiner

*Primary Examiner* — Michael F Pepitone
(74) *Attorney, Agent, or Firm* — CKC & Partners Co., LLC

(57) ABSTRACT

A surface-modified contact lens, having a surface contact angle hysteresis of less than 15°, includes a lens body and a first surface modification layer disposed on a surface of the lens body. The first surface modification layer comprises a first reactive hydrophilic polymer. The surface of the lens body has a first functional group or a second functional group, and the first reactive hydrophilic polymer has a third functional group or a fourth functional group. A first covalent cross-link bond is formed between the surface of the lens body and the first surface modification layer. The first covalent cross-link bond is formed by reacting the first functional group or the second functional group of the surface of the lens body with the third functional group or the fourth functional group of the first reactive hydrophilic polymer.

22 Claims, 7 Drawing Sheets

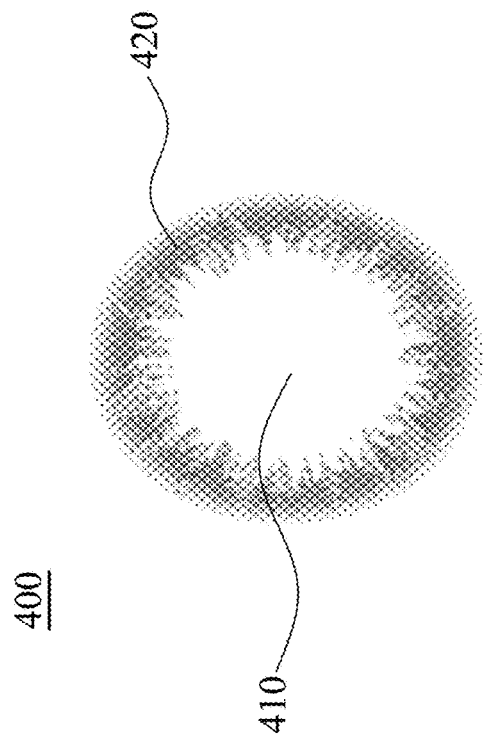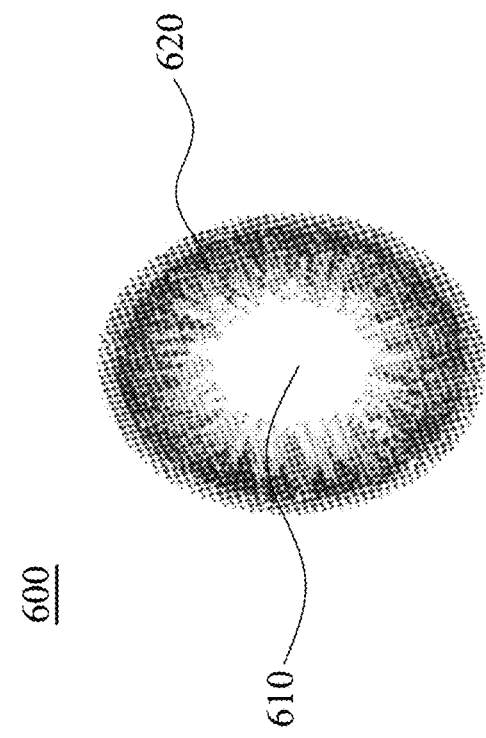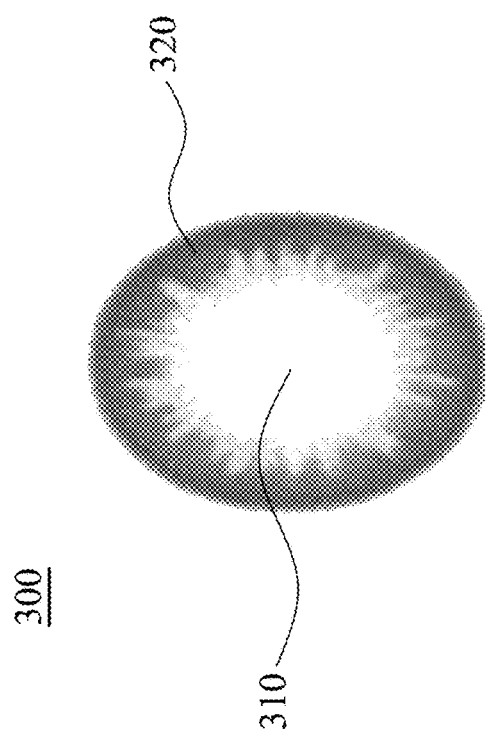

CONTACT LENS WITH SURFACE MODIFICATION AND THE METHOD FOR ITS PREPARATION

RELATED APPLICATIONS

This application claims priority to Taiwan Application Serial Number 106122592, filed Jul. 5, 2017, which is herein incorporated by reference.

BACKGROUND

Field of Invention

The present invention relates to a surface-modified contact lens and a method of fabricating a surface-modified contact lens.

Description of Related Art

With the increasing popularity of contact lenses, the contact lenses wearers have paid more and more attention on the comfort of contact lenses. Many factors affect the comfort of wearing contact lenses. The clinically important factors include lens modulus, lens design, surface wettability, and lens lubricity.

Some of the above factors are particularly important. For example, good lens lubricity can offer excellent comfort of contact lenses, and even totally overcome the discomfort caused by high modulus. In this case, the wearer does not feel the hardness of the contact lenses at all. However, the lubricity of contact lenses has been neglected for a long time.

Surface wettability is also an important factor for the comfort of contact lenses. If the contact lenses don't have good surface wettability, the contact lenses wearer may feel dryness and tiring, and may produce lipid-like deposits while wearing the contact lenses. Therefore, it may cause blurry in vision, making the wearer uncomfortable.

In general, contact lenses having surface hydrophilicity also have good surface wettability. However, it doesn't mean that they also have good lubricity. Most contact lenses currently on the market have good surface wettability, but fail to provide good lubricity. Therefore, when enhancing the surface wettability, the lubricity of contact lenses should also be improved and taken into account.

Conventional hydrogel contact lenses (i.e. non-silicone hydrogel contact lens) doesn't have siloxane components, so that the conventional hydrogel lenses are usually hydrophilic and moist. However, silicone hydrogel lenses have hydrophobic silicone components in formulation, so that the silicone hydrogel lenses do not have good hydrophilicity. Therefore, there is a need for a new approach, which is clinically acceptable, to increase the surface wettability of contact lenses. Various techniques, associated with the improvement of the surface wettability of contact lenses, have been developed for the past years. For example, in plasma treatment techniques previously proposed, the surface of the lens body is oxidized to form a surface modification layer. However, this technology is disadvantageous in high cost. Thereafter, more hydrophilic silicone monomers or macromolecules with high surface wettability are developed to manufacture contact lenses. These silicone monomers or macromolecules have been used in the composition, and the contact lenses with good surface wettability haven been successfully manufactured. Furthermore, over the past decade, in-packaging coating technology has been actively studied and evaluated since it is a cost-effective method.

Although many methods have been proposed to improve surface wettability, these methods still have some disadvantages. For example, if a hydrophilic polymer is used to react with functional groups on the surface of a lens body in order to form a surface modification layer on the lens body, the reactive functional groups of the hydrophilic polymer may react with the excess water in the reaction solvent, such as packaging solution. As a result, the surface modification layer may not be formed, and a large amount of hydrophilic polymer is wasted. In another prior art, even worse, if the hydrophilic polymers in the contact lens packaging solution are not completely reacted with active components in the packaging solution, it may cause serious consequences when these unreacted hydrophilic polymers are genotoxic. For example, these polymers may have epoxy or vinyl groups, and these groups may react with the amino groups of amino acids in protein.

SUMMARY

This present invention provides a surface-modified contact lens having a surface contact angle hysteresis of less than 15°. The surface-modified contact lens includes a lens body and a first surface modification layer disposed on a surface of the lens body. The first surface modification layer comprises a first reactive hydrophilic polymer. The surface of the lens body has a first functional group or a second functional group, and the first reactive hydrophilic polymer has a third functional group or a fourth functional group. A first covalent cross-link bond is formed between the surface of the lens body and the first surface modification layer, the first covalent cross-link bond being formed by reacting the first functional group or the second functional group of the surface of the lens body with the third functional group or the fourth functional group of the first reactive hydrophilic polymer. The first functional group and the third functional group are selected from the group consisting of a vinyl group and an epoxy group. The second functional group and the fourth functional group are selected from the group consisting of an amino group, a ammonium salt, a carboxylic acid group, a carboxylic salt, a hydroxyl group, a sulfonic acid group, and a sulfonic acid salt. When the first covalent cross-link bond is formed from the first functional group of the surface of the lens body, the fourth functional group of the first reactive hydrophilic polymer is reacted with the first functional group to form the first covalent cross-link bond, and when the first covalent cross-link bond is formed from the second functional group of the surface of the lens body, the third functional group of the first reactive hydrophilic polymer is reacted with the second functional group to form the first covalent cross-link bond.

In some embodiments of the present invention, the first reactive hydrophilic polymer is formed by a copolymerization of a hydrophilic monomer and a bifunctional monomer. The hydrophilic monomer comprises at least one of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine. The bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

In some embodiments of the present invention, the first reactive hydrophilic polymer has a hydrophilic monomer portion derived from the hydrophilic monomer and a bifunctional monomer portion derived from the bifunctional monomer. A molar ratio of the hydrophilic monomer portion to the bifunctional monomer portion is from 25:1 to 2:1.

In some embodiments of the present invention, the first reactive hydrophilic polymer has an average molecular weight of greater than 50,000.

In some embodiments of the present invention, the surface-modified contact lens further comprises a second surface modification layer disposed on the first surface modification layer. The second surface modification layer comprises a second reactive hydrophilic polymer. The second reactive hydrophilic polymer has a fifth functional group or a sixth functional group. A second covalent cross-link bond is formed between the first surface modification layer and the second surface modification layer, the second covalent cross-link bond being formed by reacting the third functional group or the fourth functional group of the first reactive hydrophilic polymer with the fifth functional group or the sixth functional group of the second reactive hydrophilic polymer. The fifth functional group is selected from the group consisting of a vinyl group and an epoxy group. The sixth functional group is selected from the group consisting of an amino group, a ammonium salt, a carboxylic acid group, a carboxylic salt, a hydroxyl group, a sulfonic acid group, and a sulfonic acid salt. When the second covalent cross-link bond is formed from the third functional group of the first reactive hydrophilic polymer, the sixth functional group of the second reactive hydrophilic polymer is reacted with the third functional group to form the second covalent cross-link bond, and when the second covalent cross-link bond is formed from the fourth functional group of the first reactive hydrophilic polymer, the fifth functional group of the second reactive hydrophilic polymer is reacted with the fourth functional group to form the second covalent cross-link bond.

In some embodiments of the present invention, the second reactive hydrophilic polymer is formed by a copolymerization of a hydrophilic monomer and a bifunctional monomer. The hydrophilic monomer comprises at least one of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine. The bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

In some embodiments of the present invention, the second reactive hydrophilic polymer has a hydrophilic monomer portion derived from the hydrophilic monomer and a bifunctional monomer portion derived from the bifunctional monomer. A molar ratio of the hydrophilic monomer portion to the bifunctional monomer portion is from 25:1 to 2:1.

In some embodiments of the present invention, the second reactive hydrophilic polymer has an average molecular weight of greater than 50,000.

In some embodiments of the present invention, the lens body is a rigid gas permeable lens body, a non-silicone hydrogel lens body, or a silicone hydrogel lens body.

In some embodiments of the present invention, the lens body is a colored lens body.

In some embodiments of the present invention, the colored lens body is a sandwiched color lens body.

Another aspect of the present invention provides a method of fabricating a surface-modified contact lens having a surface contact angle hysteresis of less than 15°. The method comprises reacting a lens body with a first reactive hydrophilic polymer at a temperature of 25-80° C. and a pH value of 7-13 to form a first surface modification layer on a surface of the lens body. The surface of the lens body has a first functional group or a second functional group, and the first reactive hydrophilic polymer has a third functional group or a fourth functional group. A first covalent cross-link bond is formed between the surface of the lens body and the first surface modification layer, the first covalent cross-link bond being formed by reacting the first functional group or the second functional group of the surface of the lens body with the third functional group or the fourth functional group of the first reactive hydrophilic polymer. The first functional group and the third functional group are selected from the group consisting of a vinyl group and an epoxy group. The second functional group and the fourth functional group are selected from the group consisting of an amino group, a ammonium salt, a carboxylic acid group, a carboxylic salt, a hydroxyl group, a sulfonic acid group, and a sulfonic acid salt. When the first covalent cross-link bond is formed from the first functional group of the surface of the lens body, the fourth functional group of the first reactive hydrophilic polymer is reacted with the first functional group to form the first covalent cross-link bond, and when the first covalent cross-link bond is formed from the second functional group of the surface of the lens body, the third functional group of the first reactive hydrophilic polymer is reacted with the second functional group to form the first covalent cross-link bond.

In some embodiments of the present invention, the first reactive hydrophilic polymer is formed by a copolymerization of a hydrophilic monomer and a bifunctional monomer. The hydrophilic monomer is selected from the group consisting of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine. The bifunctional monomer is selected from the group consisting of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

In some embodiments of the present invention, before reacting the lens body with the first reactive hydrophilic polymer, the method further comprises: copolymerizing a hydrophilic monomer with a bifunctional monomer in an aqueous solution containing a water-soluble initiator to form the first reactive hydrophilic polymer.

In some embodiments of the present invention, a molar ratio of the hydrophilic monomer to the bifunctional monomer is from 50:1 to 4:1.

In some embodiments of the present invention, after reacting the lens body with the first reactive hydrophilic polymer, the method further comprises: reacting the lens body having the first surface modification layer thereon with a second reactive hydrophilic polymer at a temperature of 25-80° C. and a pH value of 7-13 to form a second surface modification layer on the first surface modification layer. The second reactive hydrophilic polymer has a fifth functional group or a sixth functional group. A second covalent cross-link bond is formed between the first surface modification layer and the second surface modification layer, the second covalent cross-link bond being formed by reacting the third functional group or the fourth functional group of the first reactive hydrophilic polymer with the fifth functional group or the sixth functional group of the second reactive hydrophilic polymer. The fifth functional group is selected from the group consisting of a vinyl group and an epoxy group. The sixth functional group is selected from the group consisting of an amino group, a ammonium salt, a carboxylic acid group, a carboxylic salt, a hydroxyl group, a sulfonic acid group, and a sulfonic acid salt. When the second covalent cross-link bond is formed from the third functional group of the first reactive hydrophilic polymer, the sixth functional group of the second reactive hydrophilic polymer is reacted with the third functional group to form the second covalent cross-link bond, and when the second covalent cross-link bond is formed from the fourth functional group of the first reactive hydrophilic polymer, the fifth functional group of the second reactive hydrophilic polymer is reacted with the fourth functional group to form the second covalent cross-link bond.

In some embodiments of the present invention, the second reactive hydrophilic polymer is formed by a copolymerization of a hydrophilic monomer and a bifunctional monomer. The hydrophilic monomer is selected from the group consisting of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine. The bifunctional monomer is selected from the group consisting of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

In some embodiments of the present invention, before reacting the lens body with the first reactive hydrophilic polymer, the method further comprises: reacting the lens body with a vinyl-functionalizing reagent or an epoxy-functionalizing reagent to form the first functional group on the surface of the lens body.

In some embodiments of the present invention, before reacting the lens body with the first reactive hydrophilic polymer, the method further comprises: reacting the first reactive hydrophilic polymer with a vinyl-functionalizing reagent or an epoxy-functionalizing reagent to form the third functional group of the first reactive hydrophilic polymer.

In some embodiments of the present invention, reacting the lens body with the first reactive hydrophilic polymer is performed during a cleaning process of fabricating the surface-modified contact lens.

Another aspect of the present invention provides a method of fabricating a surface-modified contact lens having a surface contact angle hysteresis of less than 15°. The method comprises reacting a first reactive hydrophilic polymer with a second reactive hydrophilic polymer at a temperature of 25-80° C. and a pH value of 7-13 to form a cross-linked hydrophilic polymer; and reacting a lens body with the cross-linked hydrophilic polymer at a temperature of 25-80° C. and a pH value of 7-13 to form a surface modification layer on a surface of the lens body. The surface of the lens body has a first functional group or a second functional group, the first reactive hydrophilic polymer has a third functional group or a fourth functional group, and the second reactive hydrophilic polymer has a fifth functional group or a sixth functional group. A first covalent cross-link bond is formed between the surface of the lens body and the surface modification layer, the first covalent cross-link bond being formed by reacting the first functional group or the second functional group of the surface of the lens body with the third functional group or the fourth functional group of the first reactive hydrophilic polymer. The cross-linked hydrophilic polymer has a second covalent cross-link bond, the second covalent cross-link bond being formed by reacting the third functional group or the fourth functional group of the first reactive hydrophilic polymer with the fifth functional group or the sixth functional group of the second reactive hydrophilic polymer. The first functional group, the third functional group, and the fifth functional group are selected from the group consisting of a vinyl group and an epoxy group. The second functional group, the fourth functional group, and the sixth functional group are selected from the group consisting of an amino group, a ammonium salt, a carboxylic acid group, a carboxylic salt, a hydroxyl group, a sulfonic acid group, and a sulfonic acid salt. when the first covalent cross-link bond is formed from the first functional group of the surface of the lens body, the fourth functional group of the first reactive hydrophilic polymer is reacted with the first functional group to form the first covalent cross-link bond, and the fifth functional group of the second reactive hydrophilic polymer is reacted with the fourth functional group to form the second covalent cross-link bond, and when the first covalent cross-link bond is formed from the second functional group of the surface of the lens body, the third functional group of the first reactive hydrophilic polymer is reacted with the second functional group to form the first covalent cross-link bond, and the sixth functional group of the second reactive hydrophilic polymer is reacted with the third functional group to form the second covalent cross-link bond.

In some embodiments of the present invention, the first reactive hydrophilic polymer and the second reactive hydrophilic polymer are formed by a copolymerization of a hydrophilic monomer and a bifunctional monomer. The hydrophilic monomer comprises at least one of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine. The bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

In some embodiments of the present invention, before reacting the first reactive hydrophilic polymer with the second reactive hydrophilic polymer, the method further comprises: reacting the first reactive hydrophilic polymer with a vinyl-functionalizing reagent or an epoxy-functionalizing reagent to form the third functional group of the first reactive hydrophilic polymer.

In some embodiments of the present invention, before reacting the lens body with the cross-linked hydrophilic polymer, the method further comprises: reacting the lens body with a vinyl-functionalizing reagent or an epoxy-functionalizing reagent to form the first functional group on the surface of the lens body.

In some embodiments of the present invention, before reacting the first reactive hydrophilic polymer with the second reactive hydrophilic polymer, the method further comprises: copolymerizing a first hydrophilic monomer with a first bifunctional monomer in an aqueous solution containing a water-soluble initiator to form the first reactive hydrophilic polymer; and copolymerizing a second hydrophilic monomer with a second bifunctional monomer in an aqueous solution containing a water-soluble initiator to form the second reactive hydrophilic polymer. A molar ratio of the first hydrophilic monomer to the first bifunctional monomer is from 50:1 to 4:1. A molar ratio of the second hydrophilic monomer to the second bifunctional monomer is from 50:1 to 4:1.

In some embodiments of the present invention, reacting the lens body with the cross-linked hydrophilic polymer is performed during a cleaning process of fabricating the surface-modified contact lens.

In summary, the present invention provides a surface-modified contact lens having a surface contact angle hysteresis of less than 15°. According to the measurement of the surface contact angle hysteresis, the contact lens disclosed herein has excellent lens lubricity in addition to excellent surface wettability.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIGS. 4A to 4D are schematic views illustrating colored hydrogel contact lenses according to some embodiments of the present invention;

DETAILED DESCRIPTION

Figure 1B:
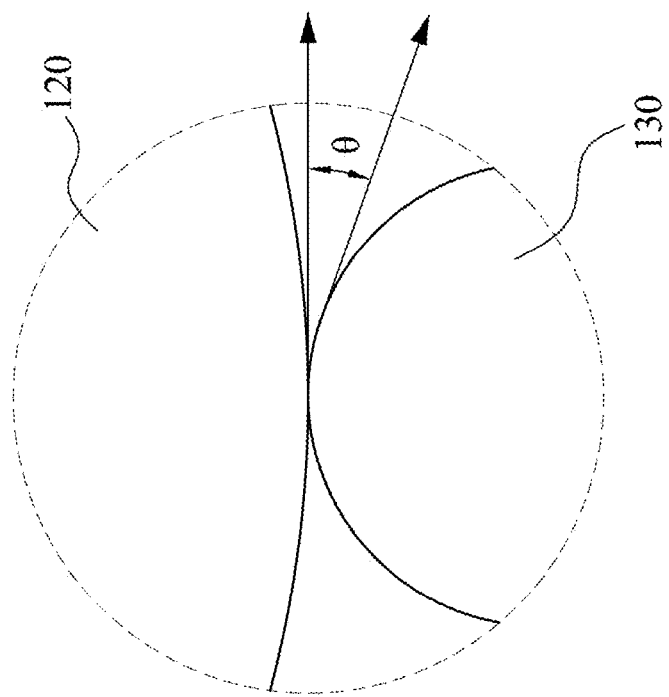
FIG. 1B is a partial enlarged schematic view illustrating the contact portion between the contact lens and the bubble according to some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Contact Lenses

In some embodiments of the present invention, the lens body of the contact lens includes any conventional lens body known in the art. For example, the lens body may be a rigid gas permeable lens body, a non-silicone hydrogel lens body, or a silicone hydrogel lens body. The non-silicone hydrogel lens body refers to a hydrogel lens body that does not have a siloxane component.

In some embodiments of the present invention, the lens body is a rigid gas permeable lens body having an oxygen permeability between 30 and 180 Barrers, a tensile modulus between 500 to 2000 MPa, and a water content of less than 5 wt %. For example, the oxygen permeability is 60 Barrers, 90 Barrers, 120 Barrers or 150 Barrers, the tensile modulus is 500 MPa, 800 MPa, 1100 MPa, 1400 MPa or 1700 MPa, and the water content is 4 wt %, 3 wt %, 2 wt %, 1 wt %, 0.5 wt % or 0.1 wt %.

In the present disclosure, "oxygen permeability" refers to the amount of oxygen passing through the polymer film per unit time, pressure gradient, and area. Oxygen permeability is an inherent property of a polymeric material. The unit of oxygen permeability is Barrer (=DK). "D" represents the diffusion rate of oxygen passing through the polymer film, and "K" represents the solubility of oxygen in the polymer film. 1 Barrer=1 DK=10−11(cm3 O2 cm)/(cm3 sec mmHg).

In the present disclosure, "tensile modulus" refers to the elasticity of the material during stretching. The value of tensile modulus is the ratio of the force required to stretch the material in the direction of the central axis to its cross-sectional area. Tensile modulus is an important property of a lens body. If the lens body is too hard (high modulus), wearer will feel uncomfortable while wearing. However, if the lens body is too soft (low modulus), the lens body is hard to be controlled by fingertip. It should be understood that a typical non-silicone hydrogel lens body has a modulus of 0.2 to 0.5 MPa, and a popular silicone hydrogel lens body has a modulus of 0.6 to 0.9 MPa. In order to achieve the balance between control and comfort, the ideal modulus of a hydrogel lens body is 0.3 to 0.6 MPa.

In the present disclosure, "water content" refers to the amount of water absorbed by the lens body in the state of equilibrium. The water content can be obtained by the following steps. First, the dry lens body is weighed, and then the dry lens body is immersed in water for several minutes. Next, the wet lens body is taken out of water, and the wet lens body is weighed. Next, the water content is calculated using the obtained dry lens body weight and wet lens body weight. Specifically, the wet lens body weight is used to subtract the dry lens body weight to produce a value, and the value is then divided by the dry lens body weight to produce the water content.

In some embodiments of the present invention, the lens body is a non-silicone hydrogel lens body having an oxygen permeability between 8 and 50 Barrers, and a tensile modulus between 0.2 to 0.8 MPa. For example the oxygen permeability is 10 Barrers, 20 Barrers, 30 Barrers or 40 Barrers, and the tensile modulus is 0.3 MPa, 0.4 MPa, 0.5 MPa, 0.6 MPa or 0.7 MPa.

In some embodiments of the present invention, the non-silicone hydrogel lens body is derived from a formulation containing at least one monomer selected from the group consisting of 2-hydroxyethyl methacrylate, glyceryl methacrylate, 2-hydroxybutyl methacrylate, poly(ethylene glycol) methacrylate, acrylic acid, methacrylic acid, maleic acid, fumaric acid, 2-acrylamido-2-methylpropanesulfonic acid, 2-aminoethyl methacrylate hydrochloride, and N-(3-aminopropyl) methacrylate hydrochloride.

In some embodiments of the present invention, the lens body is a silicone hydrogel lens body having an oxygen permeability between 40 and 180 Barrers, a tensile modulus between 0.3 to 1.5 MPa, and a water content between 24 to 75 wt %. For example the oxygen permeability is 60 Barrers, 80 Barrers, 100 Barrers, 120 Barrers, 140 Barrers or 160 Barrers, the tensile modulus is 0.6 MPa, 0.9 MPa, 1.2 MPa or 1.5 MPa, and the water content is 30 wt %, 40 wt %, 50 wt %, 60 wt % or 70 wt %.

In some embodiments of the present invention, the silicone hydrogel lens body is derived from a formulation containing a silicone monomer or a silicone macromolecule, and the formulation also contains at least one monomer selected from the group consisting of 2-hydroxyethyl methacrylate, glyceryl methacrylate, 2-hydroxybutyl methacrylate, poly(ethylene glycol) methacrylate, acrylic acid, methacrylic acid, maleic acid, fumaric acid, 2-acrylamido-2-methylpropanesulfonic acid, 2-aminoethyl methacrylate hydrochloride, and N-(3-aminopropyl) methacrylate hydrochloride.

In some embodiments of the present invention, the surface of the lens body inherently has at least one reactive functional group selected from the group consisting of vinyl group, epoxy group, amino group, ammonium salt, carboxylic acid group, carboxylic salt, hydroxyl group, sulfonic acid group, and sulfonic acid salt.

In some embodiments of the present invention, the vinyl group or the epoxy group on the surface of the lens body is formed by reacting the lens body with a vinyl-functionalizing reagent or an epoxy-functionalizing reagent. The vinyl-functionalizing reagent may comprise α-cyano acrylate, ethylene glycol diacrylate, divinyl sulfone, or any other vinyl-functionalizing reagent known in the art.

Reactive Hydrophilic Polymer

In some embodiments of the present invention, a reactive hydrophilic polymer is made by a copolymerization of a hydrophilic monomer and a bifunctional monomer. According to some embodiments of the present invention, the molar ratio of the hydrophilic monomer portion to the bifunctional monomer portion of the reactive hydrophilic polymer is from 25:1 to 2:1. For example, the molar ratio is 20:1, 14:1, 13:1, 12:1, 11:1, 10:1, 9:1, 8:1, 7:1, 6:1, 5:1, 4:1 or 3:1. It should be understood that "hydrophilic monomer portion" refers to the portion of the reactive hydrophilic polymer derived from the hydrophilic monomer in the copolymerization, and "bifunctional monomer portion" refers to the portion of the reactive hydrophilic polymer derived from the bifunctional monomer in the copolymerization.

It should be noted that if the molar ratio of the hydrophilic monomer portion to the bifunctional monomer portion is greater than 25:1, the covalent cross-link bond formed between the reactive hydrophilic polymer and the surface of the lens body is insufficient, such that the surface modification is unstable. However, if the molar ratio is less than a certain value, certain technical effects of the present invention may not be achieved, which will be described in more detail below. Therefore, there is an appropriate range of the molar ratio of the hydrophilic monomer portion to the bifunctional monomer portion.

In some embodiments of the present invention, the hydrophilic monomer portion of the reactive hydrophilic polymer absorbs at least 100-200% of its weight of water, for example, 120%, 140%, 160% or 180%.

In some embodiments of the present invention, the hydrophilic monomer comprises at least one of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine.

In certain embodiments of the present invention, some hydrophilic monomers that are hydrolytically or oxidatively unstable are specifically excluded from the present disclosure. For example, the hydrolytically or oxidatively unstable hydrophilic monomers are those monomers containing polyethylene oxide or hyaluronic acid groups.

In some embodiments of the present invention, the bifunctional monomer may or may not be hydrophilic. The bifunctional monomer has a first functional group capable of copolymerizing with a hydrophilic monomer, and a second functional group capable of reacting with a reactive functional group on the surface of the lens body.

In certain embodiments of the present invention, the bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

In some embodiments of the present invention, the reactive hydrophilic polymer inherently has at least one reactive functional group, and such reactive functional group is selected from the group consisting of a vinyl group, an epoxy group, an amino group, a ammonium salt, a carboxylic acid group, a carboxylic salt, a hydroxyl group, a sulfonic acid group, and a sulfonic acid salt.

In some embodiments of the present invention, the vinyl group or the epoxy group of the reactive hydrophilic polymer is formed by reacting the reactive hydrophilic polymer with a vinyl-functionalizing reagent or an epoxy-functionalizing reagent. The vinyl-functionalizing reagent may comprise α-cyano acrylate, ethylene glycol diacrylate, divinyl sulfone, or any other vinyl-functionalizing reagent known in the art.

It should be understood that the reactive hydrophilic polymer has a relatively large molecular weight such that the reactive hydrophilic polymer has lubricity in an aqueous solution. According to some embodiments of the present invention, the reactive hydrophilic polymer has an average molecular weight of at least 50,000, such as at least 100,000, different average molecular weights can be measured by light scattering technique, and its correlation with K-values are well known. Sample K-value and its correlation with molecular weight are further shown in Table 1.

TABLE 1

| | Correlation of PVP of different K-value and its correlation with molecular weight | | | |
|---|---|---|---|---|
| | PVP K30 | PVP K60 | PVP K90 | PVP K 120 |
| K-Value (viscosity of 1% solution) | 26-35 | 50-62 | 80-100 | 108-130 |
| weight average molecular weight by light scattering | 40,000-80,000 | 240,000-450,000 | 900,000-1,5000,000 | 2,000,000-3,000,000 | at least 500,000, at least 750,000, or at least 1,000,000. The "average molecular weight" refers to the weight average molecular weight.

Method of Fabricating a Reactive Hydrophilic Polymer

In some embodiments of the present invention, the reactive hydrophilic polymer is formed by copolymerizing a hydrophilic monomer with a bifunctional monomer in an aqueous solution containing a water-soluble initiator.

In some embodiments of the present invention, the molar ratio of the hydrophilic monomer to the bifunctional monomer is from 50:1 to 4:1, for example, 45:1, 40:1, 35:1, 30:1, 25:1, 20:1, 15:1, 10:1 or 5:1.

In some embodiments of the present invention, the total concentration of the hydrophilic monomer and the bifunctional monomer in the reaction solvent is from 5-30 wt %, for example, 10 wt %, 15 wt %, 20 wt % or 25 wt %.

In some embodiments of the present invention, the concentration of the water-soluble initiator in the reaction solvent is 0.03 to 0.5 wt %, for example, 0.05 wt %, 0.1 wt %, 0.2 wt %, 0.3 wt % or 0.4 wt %.

In some embodiments of the present invention, the temperature of the copolymerization is from 30° C. to 60° C., for example at 35° C., 40° C., 45° C., 50° C. or 55° C.

In some embodiments of the present invention, the water-soluble initiator may be a thermal initiator or a photo initiator. In some embodiments of the present invention, the thermal initiator is selected from the group consisting of potassium persulfate, sodium persulfate, ammonium persulfate, 2,2'-azobis(2,4-dimethylvaleronitrile), 2,2'-azobis(2-methylpropionitrile), 2,2'-azobis(2-methylbutyronitrile), peroxides (e.g., benzoyl peroxide), and 2,2'-azobis(isobutyronitrile)(AIBN). In some embodiments of the present disclosure, the photo initiator is selected from the group consisting of benzoin methyl ether, diethoxyacetophenone, benzoyl diphenyl phosphine oxide (e.g., 2,4,6-trimethylbenzoyl diphenyl phosphine oxide, bis-(2,6-dichlorobenzyl)-4-N-propylphenyl phosphine oxide or bis-(2,6-dichlorobenzyl)-4-N-butylphenyl phosphine oxide), and 1-hydroxycyclohexyl phenyl ketone.

Lubricity

It should be appreciated that contact lens lubricity information is seldom disclosed, and is only indirectly indicated as the reversal of coefficient of friction. Due to the lack of standard equipment for measuring coefficient of friction, it is difficult to compare the lubricity between different contact lenses.

For lubricity of hydrophilic polymer, it is well known that polyvinyl pyrrolidone (PVP) can provide a hydrogel contact lens with good lubricity. polyvinyl pyrrolidone polymers of As shown in Table 1, the higher the weight average molecular weight of polyvinyl pyrrolidone, the higher the k-value and the higher the lubricity. Thus, it is reasonable to use the lubricity of polyvinyl pyrrolidone aqueous solution as the benchmark for screening reactive hydrophilic polymers. It should be noted that the lubricity of the 1% aqueous copolymer solution prepared from the hydrophilic polymer of the present disclosure must be equal to or higher than the lubricity of PVP K30, and is preferably equal to or better than that of K60 PVP.

Surface Modification

In some embodiments of the present invention, the surface modification is carried out in a hydration process. Specifically, the reactive functional group on the surface of the lens body is reacted with the reactive functional group of the reactive hydrophilic polymer to form a surface modification layer on the surface of the lens body.

It will be appreciated that the reactive functional group on the surface of the lens body and the reactive functional group of the reactive hydrophilic polymer must be able to react with each other to form covalent cross-link bond. In some embodiments of the present invention, a first reactive functional group selected from the group consisting of hydroxide anion, carboxylate anion, sulfonate anion, and amine can react with a second reactive functional group selected from the group consisting of vinyl group and epoxy group. The vinyl group refers to any group containing at least one C=C group. For examples, the vinyl groups include but not limited to (meth)acryloyl, allyl, vinyl, styryl or other groups containing C=C. The epoxy group refers to any group containing at least one epoxy group. For examples, the epoxy groups include but not limited to ethylene oxide, propylene oxide, or other groups containing epoxy groups.

In some embodiments of the present invention, the surface modification is carried out in an aqueous solution at a temperature of 25° C.–80° C. and at a suitable pH value. The suitable pH value may be between 7 and 13. For example, carboxylic group can turn to carboxylate at pH above 5, and it can react with a hot vinyl group at a pH above 7. An ammonium salt of a primary amine can be neutralized into a reactive primary amine at pH above 8, and it would react with a hot vinyl group easily at pH above 9. A hydroxyl can become an oxide anion at pH above 12, and then it becomes very reactive towards hot vinyl group. The "hot vinyl group" refers to those vinyl groups which can have an addition reaction with an amine, a carboxylate anion, an oxide anion or a sulfonate anion. Although the hot vinyl groups can also react with a thiol group, but there are some disadvantages when using thiol groups to react with hot vinyl groups. For examples, it is difficult to obtain a thiol group on the surface of the lens body or the reactive hydrophilic polymer by a modification, the smell of thiol is strong and disgusting, and the acceptance of final product is low.

In some embodiments of the present invention, the concentration of the reactive hydrophilic polymer in the aqueous solution is 0.005 to 1 wt %, for example, 0.01 wt %, 0.05 wt %, 0.1 wt %, 0.2 wt %, 0.3 wt %, 0.4 wt %, 0.5 wt %, 0.6 wt %, 0.7 wt %, 0.8 wt % or 0.9 wt %. If the concentration of the reactive hydrophilic polymer in the aqueous solution is less than 0.005 wt %, the reaction takes a lot of time. However, if the concentration exceeds 1%, it will increase the cost too much.

In some embodiments of the present invention, one reactive hydrophilic polymer is used in the surface modification. In some embodiments of the present invention, two reactive hydrophilic polymers are used in the surface modification. In some embodiments of the present invention, the two reactive hydrophilic polymers are used in different steps.

It should be understood that it is generally sufficient to use one reactive hydrophilic polymer in the surface modification to fabricate contact lenses with excellent surface wettability. It is undesirable to use two reactive hydrophilic polymers in one step to fabricate contact lenses, because the two reactive hydrophilic polymers may react with each other rather than react with the reactive functional groups on the surface of the lens body. In addition, if the two reactive hydrophilic polymers are used in one step, there may be a problem that the thickness of the surface modification layer is not uniform. However, if the two reactive hydrophilic polymers are reacted with the lens body in different steps, the desired thickness can be precisely controlled.

In some embodiments of the present invention, a cross-linked hydrophilic polymer is used in the surface modification. The "cross-linked hydrophilic polymer" is made from two different reactive hydrophilic polymers. It should be understood that the cross-linked hydrophilic polymer has a first reactive functional group and a second reactive functional group. The amount of the first reactive functional group is more than the amount of the second reactive functional group, such that the first reactive functional group can react with the reactive functional groups on the surface of the lens body in the subsequent step. It is worth mentioning that the thickness of the surface modification layer can be controlled by using such cross-linked hydrophilic polymer in the surface modification.

In some embodiments of the present invention, only a portion of the surface of the lens body (e.g., a single surface or a portion of the surface) reacts with the reactive hydrophilic polymer to form the surface modification layer. In some embodiments of the present invention, two different reactive hydrophilic polymers react with different surfaces or different portions of the lens body to form a surface modification layer(s). For example, a first reactive hydrophilic polymer reacts with at least a portion of the convex surface of the lens body to form a surface modification layer, and a second reactive hydrophilic polymer reacts with at least a portion of the concave surface of the lens body to form another surface modification layer. In addition, the surface modification layers formed of different reactive hydrophilic polymers may or may not be in contact with each other.

Contact Angle Hysteresis

It should be understood that the surface wettability of a contact lens is generally associated with contact angle, and the method of measuring contact angle in the present disclosure is captive bubble method. Since the hydrophilic behavior of contact lenses correlates with the surface contact angle, captive bubble method is often used as a measurement method of wettability or hydrophilicity of contact lenses in the contact lens industry. In addition, the measuring fixture used in captive bubble method can be customized and easy to operate.

Figure 1A:
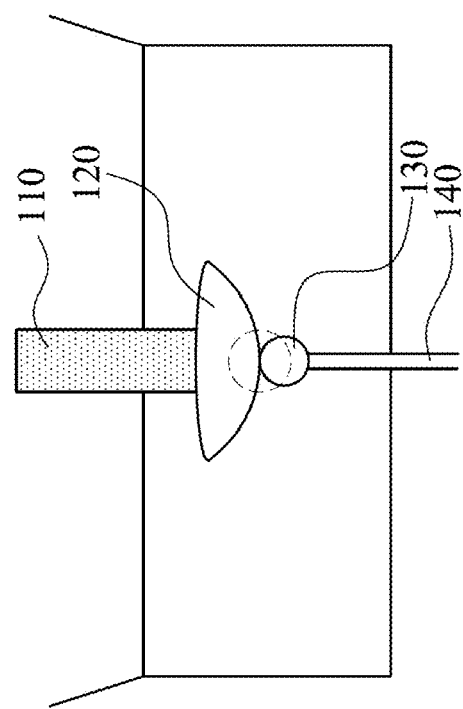
FIG. 1A is a schematic view illustrating a device for captive bubble method according to some embodiments of the present invention.

Please refer to FIGS. 1A and 1B. FIG. 1A is a schematic view illustrating a device 100 for captive bubble method according to some embodiments of the present invention. As shown, the device 100 includes a measuring fixture 110 and a test contact lens 120 immersed in a buffered saline. A bubble 130 from an injector 140 is positioned on a surface of the contact lens 120. FIG. 1B is a partial enlarged schematic view illustrating the contact portion between the contact lens 120 and the bubble 130. It should be understood that the size of the contact angle Θ between the contact lens 120 and the bubble 130 in the aqueous solution depends on the expansion or shrinkage of the bubble 130. The expansion or shrinkage of the bubble 130 is related to the injector 140 injecting or drawing gas.

Figure 1C:
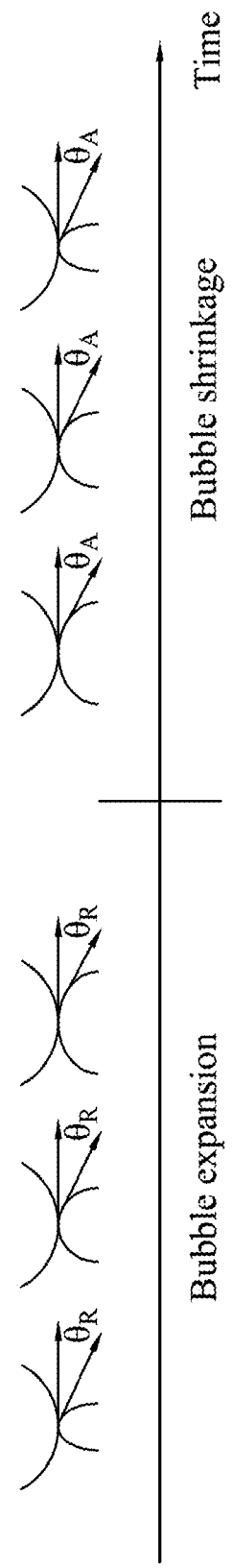
FIG. 1C is a schematic view illustrating the change of the dynamic contact angle according to some embodiments of the present invention.

In the captive bubble method, the contact lens 120 is disposed below the measuring fixture 110, and is immersed in a buffered saline (e.g., a borate or phosphate buffer solution). The injector 140 is spaced a distance from the surface of the contact lens 120. The injector 140 injects gas to form bubble 130. Please refer to FIG. 1C. FIG. 1C shows the change of the dynamic contact angle. Initially, the injector 140 injects gas, and the bubble 130 moves toward the surface of the contact lens 120 at a constant speed. When the bubble 130 is in contact with the surface of the contact lens 120, the bubble 130 starts to expand and the water starts to recede. At this time, the contact angle is recorded at a constant time interval. Since water is receded from the surface of the contact lens 120, so that the average number of the first few data recorded is referred to as "receding contact angle $\Theta_R$". Because the surface of the contact lens 120 is in contact with the hydrophobic bubble 130, the hydrophobic component of the contact lens 120 rotates to the surface of the contact lens 120 in contact with the bubble 130. Then, after a predetermined time period, the injector 140 stops injecting gas and starts to drawing gas. The bubble 130 starts to shrink and the water starts to advance, and the contact angle is recorded at a constant time interval. Since the water is advancing toward the surface of the contact lens 120, the average number of the first few data recorded is referred to as "advancing contact angle $\Theta_A$". Since the hydrophobic component of the contact lens 120 has been rotated to the surface of the contact lens 120 in contact with the bubble 130, the advancing contact angle reflects the hydrophilicity or hydrophobicity of the surface of the contact lens 120.

Figure 2A:
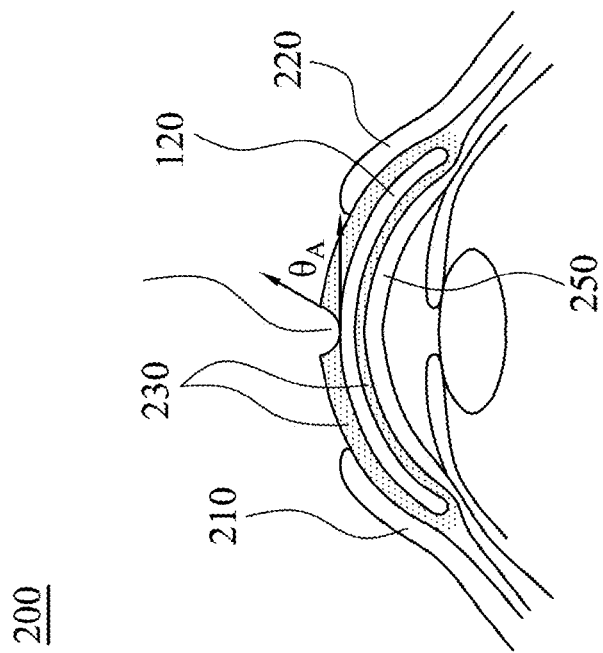
FIG. 2A is a schematic view illustrating the evaporation of tears from the surface of the lens according to some embodiments of the present invention.
Figure 2B:
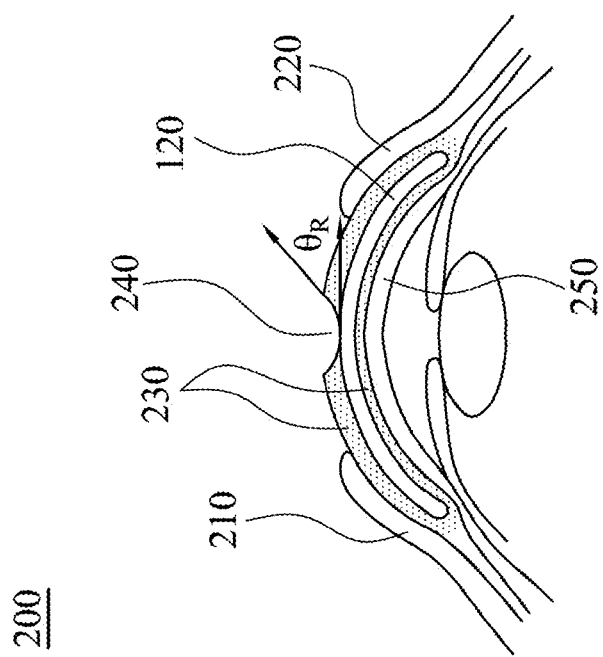
FIG. 2B is a schematic view illustrating the inflow of tears from the eyelid to the surface of the lens according to some embodiments of the present invention.

Clinically, the captive bubble method is meaningful because it works like the way human tear films work in human eyes. Please refer to FIG. 2A. FIG. 2A is a schematic view illustrating the evaporation of tears from the surface of the contact lens according to some embodiments of the present invention. At the beginning, the wearer wears the contact lens 120 on the cornea 250, and the tear spreads over the lens body to form the tear film 230. As time passes, the tear evaporates, and the tear recedes from the center of the cornea 250. Therefore, a bubble gap 240 is formed in the tear film 230 on the surface of the contact lens 120. At this time, it corresponds to the state of the receding contact angle of bubble method, and a receding contact angle $\Theta_R$ is presented between the bubble gap 240 and the surface of the contact lens 120. Please refer to FIG. 2B. FIG. 2B is a schematic view illustrating the inflow of tears from the eyelid to the surface of the lens according to some embodiments of the present invention. As time passes, the wearer blinks, and the tear flows from the upper eyelid 210 and the lower eyelid 220 to the center of the contact lens 120. At this time, it corresponds to the state of the advancing contact angle of the bubble method, and an advancing contact angle $\Theta_A$ is presented between the bubble gap 240 and the surface of the contact lens 120.

It should be understood that the difference between the advancing contact angle and the receding contact angle is referred to as "contact angle hysteresis". When a contact lens is in contact with water, the hydrophilic component of the contact lens rotates to the surface in contact with the bubble, so that the surface of the contact lens becomes very hydrophilic. Thus, the receding contact angles of these contact lenses are about the same. However, the advancing contact angles of these contact lenses are different. Since the advancing contact angle of different contact lenses depends on the hydrophilicity or hydrophobicity of the surface of the contact lens, it is generally considered that the advancing contact angle is more meaningful than the receding contact angle.

However, there is no standardized device for measuring the dynamic contact angle. Therefore, the advancing contact angle and the receding contact angle may vary depending on the difference of the measuring fixture, operating environment, or operator. However, "contact angle hysteresis" can reflect the hydrophilicity of contact lenses, and it does not vary depending on the difference of the measuring fixture, operating environment, or operator. Thus, the contact angle hysteresis can be used to evaluate the hydrophilicity of contact lenses. As a surface-modified contact lens of this disclosure, it has excellent wettability of surface contact angle hysteresis <15°.

Surface Modification Layer Durability

In some embodiments of the present invention, the surface-modified contact lens can maintain a low value of surface contact angle hysteresis for a long period time under normal storage conditions or under any harsh testing conditions. It means that the surface modification layer is substantially permanent. The harsh testing conditions include (a) rubbing 300 rounds in water with fingertip, (b) extracting with isopropanol for 4 hours, and (c) autoclaving contact lenses in saline for 5 times. The surface modification layer is considered to pass these durability tests if the contact angle hysteresis of each contact lens tested shows no more than 5° change before and after these tests.

Dehydration Rate

It is well known that contact lens drying is the main reason for the wearer to abandon contact lenses. An unexpected discovery in this invention is that a surface-modified contact lens has lower rate of dehydration than the same contact lens without surface modification. It means that the wearer may feel less dry when wearing the surface-modified contact lenses.

Hereinafter, the present disclosure will be described in detail with reference to the embodiments and comparative examples in the present disclosure. However, the present disclosure is not limited to the following embodiments.

Example 1: Dynamic Contact Angle Measurement of Commercially Available Silicone Hydrogel Lenses Commercially available silicone hydrogel contact lenses from major contact lens manufacturers are measured by using captive bubble method. The contact lenses and their key properties are shown in Table 2.

TABLE 2

Representative silicone hydrogel contact lenses and their key properties

| Lens body | USAN Name | Water content | Oxygen permeability (DK) | Modulus (MPa) |
|---|---|---|---|---|
| Dailies Total 1 | Delefilcon | 33% | 110 | 0.80 |
| PureVision | Balafilcon | 36% | 99 | 0.90 |
| Oasys | Senofilcon | 38% | 103 | 0.65 |
| TruEye | Narafilcon | 46% | 100 | 0.70 |
| Biofinity | Comfilcon | 48% | 128 | 0.70 |
| Clariti | Somofilcon | 55% | 60 | 0.50 |

The advancing contact angle, the receding contact angle, and the contact angle hysteresis are tabulated as Table 3, along with reference from available data of literature if available. (Reference: M. Read, P. Morgan, J. Kelly and C. Maldonado-Codina; "Dynamic contact angle analysis of silicone hydrogel contact lenses", J. Biomater Appl, published online 10 Mar. 2010; L. Cheng and C. Radke; "wettability of silicone hydrogel contact lenses in the presence of tear-film component", Current Eye Research, 2004, 28:93-108)

TABLE 3

Dynamic contact angles of representative silicone hydrogel contact lenses

| Lens body | Advancing contact angle | Receding contact angle | Contact angle hysteresis |
|---|---|---|---|
| Dailies Total 1 | 34.80 | 28.82 | 5.98 |
|  | 34.29 | 28.18 | 6.11 |
|  | 34.26 | 29.24 | 5.02 |
| Average | 34.45 | 28.75 | 5.70 |
| Reference |  | N/A |  |
| Pure vision | 92.30 | 29.31 | 62.99 |
|  | 81.51 | 30.69 | 50.82 |
|  | 86.20 | 28.44 | 57.76 |
| Average | 86.67 | 29.48 | 57.19 |
| Reference 1 | 71.50 | 18.30 | 53.30 |
| Reference 2 | 80.00 | 24.00 | 56.00 |
| Biofinity | 42.11 | 30.90 | 11.21 |
|  | 43.81 | 32.04 | 11.78 |
|  | 41.23 | 31.33 | 9.90 |
| Average | 42.38 | 31.42 | 10.96 |
| Reference 1 | 29.60 | 18.60 | 11.10 |
| Clariti | 53.55 | 29.25 | 24.29 |
|  | 48.72 | 29.99 | 18.73 |
|  | 49.57 | 29.30 | 20.27 |
| Average | 50.61 | 29.51 | 21.10 |
| Reference 1 | 42.20 | 17.50 | 24.70 |
| Oasys (Senofilcon) | 50.74 | 29.71 | 21.03 |
|  | 46.57 | 30.15 | 16.41 |
|  | 48.11 | 28.49 | 19.62 |
| Average | 48.47 | 29.45 | 19.02 |
| Reference 1 | 35.40 | 22.10 | 13.30 |
| True eye (Narafilcon) | 40.45 | 29.51 | 10.94 |
|  | 49.01 | 29.81 | 19.20 |
|  | 40.18 | 32.00 | 8.18 |
| Average | 43.22 | 30.44 | 12.78 |
| Reference 1 | 37.00 | 22.10 | 14.90 |

"N/A" means no data in the reference
"Average" means average contact angles
"Reference" means reference contact angle data from publication identified As shown in Table 3, the receding contact angles of the aforementioned contact lenses are close, indicating that they have about the same hydrophilicity in aqueous solution. However, for the same contact lenses, the receding contact angles or advancing contact angels of reference articles are very different (8-15°) from the value measured in the present disclosure. That is, different measuring fixtures, different lab environments, and different operators may cause differences in contact angle. It is noteworthy that, regardless of the above differences, the surface contact angle hysteresis is about the same (difference is less than 6°). That is, surface contact angle hysteresis can be used as an indicator of surface wettability or hydrophilicity of a contact lens, and the lower the surface contact angle hysteresis, the better the surface wettability.

Example 2. Preparation of a Copolymer of N-Vinyl Pyrrolidone and Acrylic Acid

A polymerization reaction unit comprising a 3-neck 500-mL round bottom flask, a reflux condenser, a dropping funnel and a nitrogen inlet tube was assembled. Then, N-vinyl pyrrolidone (33.3 g), water (100 g), and 0.035 mg of potassium persulfate were added into the flask and the content was stirred with a stirring bar. A solution containing 2.4 g of acrylic acid (AA) and 16 mL of water was added into the dropping funnel. Then through the dropping funnel, $\frac{1}{10}$ of acrylic acid solution was added into the flask. The contents in the flask were stirred with a magnet stirring bar and bubbled with nitrogen for 30 minutes. After that the content was heated with an oil bath at 60° C. and the monomer started to polymerize and the solution became more viscous. The polymerization was stopped after 7 hours. The solution was then poured into acetone to precipitate the product. 28 grams of product was recovered.

NMR indicated the molar ratio of the product was N-vinyl pyrrolidone:acrylic acid=6:1. The 1% solution lubricity was found better than that of PVP K60, but lower than that of PVP K90.

Example 3. Preparation of a Copolymer of N-Vinyl Pyrrolidone and Vinyl-Functionalized Acrylic Acid A 3-neck, 500-mL, round bottom was attached to a reflux condenser, a nitrogen inlet tube and a dropping funnel. Then 18.1 g of divinyl sulfone, 50 mL of water and sodium hydroxide was added into the flask to adjust its pH to 9.0. 200 mL of 2% aqueous solution of copolymer of N-vinyl pyrrolidone and acrylic acid from Example 2 was filled into the dropping funnel. The flask was then heated with constant stirring at 40° C. Then the copolymer solution was added into the flask over a period of 1 hour. After that, the heating was continued for 2 hours. The solution was then cooled down. It was then dialyzed to remove unreacted divinyl sulfone.

The concentration was adjusted to 1% copolymer in water and with pH adjusted to 7.30. The 1% solution lubricity was found better than that of PVP K60, but lower than that of PVP K90.

Example 4. Preparation of Copolymer of N-Vinyl Pyrrolidone and N-(3-Aminopropyl) Methacrylamide Hydrochloride The set up for polymerization and reaction conditions were the same as that of making copolymer of N-vinyl pyrrolidone and acrylic acid as shown in Example 2, except that aqueous N-(3-aminopropyl) methacrylamide hydrochloride solution at 5% concentration is used. And the molar feed of N-vinyl pyrrolidone to N-(3-aminopropyl) methacrylamide hydrochloride is at 9:1. After finishing polymerization and recovering the product.

The molar ratio of product is N-vinyl pyrrolidone:N-(3-aminopropyl) methacrylamide hydrochloride=7:1 The 1% solution lubricity was found better than that of PVP K60, but lower than that of PVP K90.

Example 5. Preparation of Copolymer of N-Vinyl Pyrrolidone and Vinyl Functionalized N-(3-Aminopropyl) Methacrylamide Hydrochloride A 3-neck, 500-mL, round bottom is attached to a reflux condenser, a nitrogen inlet tube and a dropping funnel. Then 30.96 g of ethylene glycol diacrylate, 100 mL of water and sodium hydroxide are added into the flask to adjust its pH to 9.0. 200 mL of 2% aqueous solution of copolymer from Example 4 is filled into the dropping funnel. The flask is then heated with constant stirring at 40° C. Then the copolymer solution is added into the flask over a period of 1 hour. After that, the heating is continued for 2 hours. The solution is then cooled down. It is then dialyzed to remove unreacted ethylene glycol diacrylate.

The concentration is adjusted to 1% copolymer in water and with pH adjusted to 7.30. The 1% solution lubricity is found better than that of PVP K60, but lower than that of PVP K90.

Example 6. Preparation of Copolymer of Acrylamide and Acrylic Acid

The set up for polymerization was the same as that of Example 2 except that no dropping funnel was used. Acrylamide and acrylic acid at a molar ratio of 9:1 were used and the concentration of monomers in water was 10%. Potassium persulfate at 0.1% concentration was used. After bubbling the mixture with nitrogen for 30 minutes, the content was heated under oil bath at 40° C. Polymerization started rapidly and the solution became very viscous. After 16 hours, polymerization was suspended. Solid copolymer product was recovered and purified by pouring the polymer solution into acetone to precipitate the product.

The structure of copolymer was determined by NMR and indicated the molar ratio of acrylamide to acrylic acid was 9.3:1. The 1% solution lubricity was found better than that of PVP K90.

Example 7. Preparation of Copolymer of Acrylamide and Vinyl-Functionalized Acrylic Acid The reaction set up and reaction condition were the same as that of Example 3, except copolymer of acrylamide and acrylic acid of Example 6 was used in place of the copolymer of N-vinyl pyrrolidone and acrylic acid. After reaction completed, the product was purified by dialysis to remove unreacted divinyl sulfone.

The concentration was adjusted to 1% copolymer in water and with pH adjusted to 7.30. The 1% solution lubricity was found better than that of PVP K90.

Example 8. Preparation of Copolymer of Acrylamide and 2-Hydroxyethyl Methacrylate (HEMA)

The set up for polymerization and reaction conditions are the same as that of making copolymer of acrylamide and acrylic acid as shown in Example 6 except that 2-hydroxyethyl methacrylate is used to replace acrylic acid. After finishing polymerization and recovering the product.

The molar ratio of product is acrylamide:2-hydroxyethyl methacrylate=9:1. The 1% solution lubricity is found better than that of PVP K90.

Example 9. Preparation of Copolymer of Acrylamide and Vinyl-Functionalized HEMA The reaction set up and reaction condition are the same as that of Example 7, except aqueous solution of copolymer of acrylamide and 2-hydroxyethyl methacrylate from Example 8 is used and the pH of the divinyl sulfone solution inside the reaction flask is adjusted to 12. After reaction completed, the product is purified by dialysis to remove unreacted divinyl sulfone.

The concentration is adjusted to 1% copolymer in water and pH adjusted to 7.30. The 1% solution lubricity is found better than that of PVP K90.

Example 10. Preparation of Copolymer of Acrylamide and N-(3-Aminopropyl) Methacrylamide Hydrochloride The set up for polymerization was the same as that of Example 6, except that acrylamide and N-(3-aminopropyl) methacrylamide hydrochloride at a molar ratio of 9:1 was used and the concentration of monomers in water was 10%. Potassium persulfate at 0.1% concentration was used. After bubbling the mixture with nitrogen for 30 minutes, the content was heated under oil bath at 40° C. Polymerization started rapidly and the solution became very viscous. After 16 hours, polymerization was suspended. Solid copolymer product was recovered and purified by pouring the polymer solution into acetone to precipitate the product.

The structure of copolymer was determined by NMR and indicated the molar ratio of acrylamide to N-(3-aminopropyl) methacrylamide hydrochloride was 7.0:1. The 1% solution lubricity was found better than that of PVP K90.

Example 11. Preparation of Copolymer of Acrylamide and 2-Aminoethyl Methacrylate Hydrochloride The set up for polymerization was the same as that of Example 6, except that acrylamide and 2-aminoethyl methacrylate hydrochloride at a molar ratio of 9:1 was used and the concentration of monomers in water was 10%. Potassium persulfate at 0.1% concentration was used. After bubbling the mixture with nitrogen for 30 minutes, the content was heated under oil bath at 40° C. Polymerization started rapidly and the solution became very viscous. After 16 hours, polymerization was suspended. Solid copolymer product was recovered and purified by pouring the polymer solution into acetone to precipitate the product.

The structure of copolymer was determined by NMR and indicated the molar ratio of acrylamide to 2-aminoethyl methacrylate hydrochloride was 6:1. The 1% solution lubricity was found better than that of PVP K90.

Example 12. Preparation of Copolymer of Acrylamide and Vinyl-Functionalized 2-Aminoethyl Methacrylate Hydrochloride The reaction set up and reaction condition are the same as that of Example 9, except aqueous solution of copolymer of acrylamide and 2-aminoethyl methacrylate hydrochloride from Example 11 is used. After reaction completed, the product is purified by dialysis to remove unreacted divinyl sulfone.

The concentration is adjusted to 1% copolymer in water and pH adjusted to 7.30. The 1% solution lubricity was found better than that of PVP K90.

Example 13. Preparation of Copolymer of Glyceryl Methacrylate and Acrylic Acid The set up for polymerization was the same as that of Example 6, except that glyceryl methacrylate and acrylic acid at a molar ratio of 9:1 were used and the concentration of monomers in water was 10%. Potassium persulfate at 0.1% concentration was used. After bubbling the mixture with nitrogen for 30 minutes, the content was heated under oil bath at 40° C. Polymerization starts rapidly and the solution became very viscous. After 16 hours, polymerization was terminated. Solid copolymer product was recovered and purified by pouring the polymer solution into acetone to precipitate the product.

The structure of copolymer was determined by NMR and indicated the molar ratio of glyceryl methacrylate to acrylic acid was 6.5:1. The 1% solution lubricity was found better than that of PVP K60, but lower than that of PVP K90.

Example 14. Preparation of Copolymer of Glyceryl Methacrylate and Vinyl-Functionalized Acrylic Acid The reaction set up and reaction condition were the same as that of Example 7, except aqueous solution of copolymer of glyceryl methacrylate and acrylic acid from Example 13 was used. After reaction completes, the product was purified by dialysis to remove unreacted divinyl sulfone.

The concentration was adjusted to 1% copolymer in water and with pH adjusted to 7.30. The 1% solution lubricity was found better than that of PVP K60, but lower than that of PVP K90.

Example 15. Preparation of Copolymer of Glyceryl Methacrylate and N-(3-Aminopropyl) Methacrylamide Hydrochloride The set up for polymerization is the same as that of Example 6, except that glyceryl methacrylate and N-(3-aminopropyl) methacrylamide hydrochloride at a molar ratio of 25:1 are used and the concentration of monomers in water was 10%. Potassium persulfate at 0.1% concentration is used. After bubbling the mixture with nitrogen for 30 minutes, the content is heated under oil bath at 40° C. Polymerization starts rapidly and the solution becomes very viscous. After 16 hours, polymerization is terminated. Solid copolymer product is recovered and purified by pouring the polymer solution into acetone to precipitate the product.

The structure of copolymer determined by NMR and indicated the molar ratio of glyceryl methacrylate to N-(3-aminopropyl) methacrylamide hydrochloride was 23.5:1. The 1% solution lubricity is found better than that of PVP K60, but lower than that of PVP K90.

Example 16. Preparation of Copolymer of Glyceryl Methacrylate and Vinyl-Functionalized N-(3-Aminopropyl) Methacrylamide Hydrochloride The reaction set up and reaction condition were the same as that of Example 7, except aqueous solution of copolymer of glyceryl methacrylate and N-(3-aminopropyl) methacrylamide hydrochloride from Example 15 is used. After reaction completes, the product is purified by dialysis to remove unreacted divinyl sulfone.

The concentration is adjusted to 1% copolymer in water and with pH adjusted to 7.30. The 1% solution lubricity is found better than that of PVP K60, but lower than that of PVP K90.

Next, lens bodies are manufactured.

Example 17. Process for Making Silicone Hydrogel Lens Body with High Oxygen Permeability A silicone hydrogel lens body with 54% water content and an oxygen permeability of 90 Barrers was made from a formulation comprising the following: N-vinyl pyrrolidone (NVP), 2-hydroxyethyl mathacrylate (HEMA), N,N-dimethylaniline (DMA), methacrylic acid (MAA), (3-Methacryloxy-2-hydroxypropoxy) propyl bis(trimethyl-siloxy) methylsilane (SIGMA), a silicone macromer having an average molecular weight of 1,500, bis(2,4,6-trimethylbenzoyl)-phenylphosphineoxide, ethylene glycol dimethacrylate, triallyl-s-triazine-2,4,6(1H,3H,5H)-trione, and 2(2-hydroxy-5-methacryloxyethylphenyl)-2H-benzotriazole in the amount of 1.5 wt % based on the total weight of the reaction mixture, Irgacure 819, Reactive Blue 19 and t-amyl alcohol. The formulation was cast between two polypropylene molds and cured under visible light for 12 minutes. Lenses were then dry released and then extracted in isopropanol at 40° C. for 1 hour, 50/50 isopropanol/water at 40° C. for an hour, Di-ionized water at 40° C. for 1 hour and then placed in borate buffered saline at pH 7.30 and then autoclaved. Dynamic Contact angle measurements were performed for 5 lenses aforementioned and an average surface contact angle hysteresis of 75° was obtained.

Example 18. Process for Making Silicone Hydrogel Lens Body with Middle Oxygen Permeability A silicone hydrogel lens body with 66% water content and an oxygen permeability of 60 Barrers was made from a formulation comprising the following: 2-hydroxyethyl mathacrylate (HEMA), N,N-dimethylaniline (DMA), methacrylic acid (MAA), a water soluble silicone macromere of Mn 3000, ethylene glycol dimethacrylate, trimethylopropane trimethacrylate, Irgcure 819, Reactive Blue 19 and t-amyl alcohol. The formulation was cast between two polypropylene molds and cured under visible light for 12 minutes. Lenses were then dry released and then extracted in de-ionized water at 40° C. for 1 hour and then placed in borate buffered saline at pH 7.40 and then autoclaved. Dynamic Contact angle measurements were performed for 5 lenses and an average surface contact angle hysteresis of 49° was obtained.

Example 19. Process for Making Etafilcon a Hydrogel Lens Body

A formulation comprising 2-hydroxyethyl methacrylate, methacrylic acid, ethyleneglycol dimethacrylte, trimethylopropane trimethacrylate, 2(2-hydroxy-5-methacryloxyethylphenyl)-2H-benzotriazole, Reactive Blue 19, Irgcure 819 and glycerine was prepared. The formulation was cast between two propylene molds and cured under visible light. After dry leased from molds, dry lenses were extracted with water and then placed in borate buffered at 7.40. Lenses were then autoclaved. These lenses had a water content of 58%. 10 Lenses were measured for dynamic contact angles and an average surface contact angle hysteresis of 19.2° was obtained.

Example 20. Process for Making Etafilcon a Colored Hydrogel Lens Body

The process for making etafilcon A colored lens body was the same as that described in Example 19, except the desired ink containing the desired colored pigment was pad-printed onto the mold and lightly cured under visible light before lens formulation was injected into the same mold. After lens cured, the lens formulation was cast between two propylene molds and cured to obtain a colored hydrogel lens body according to the same manner as described above. Lenses were then stored in borate buffered saline at pH 7.40 and then autoclaved. In addition, for sandwiched color lens body, a clear coat was first pad-printed onto the same mold and lightly cured before the ink was pad-printed onto the mold. Then, the same curing and hydration process were performed to get the sandwiched color lens body stored in borate buffered saline and autoclaved.

Example 21. Process for Making Polymacon Hydrogel Lens Body

A formulation comprising 2-hydroxyethyl methacrylate, ethyleneglycol dimethacrylte, 2(2-hydroxy-5-methacryloxyethylphenyl)-2H-benzotriazole, Reactive Blue 19, Irgcure 819 and glycerine was prepared. The formulation was cast between two propylene molds and cured under visible light. After dry leased from molds, dry lenses were extracted with water and then placed in borate buffered at 7.40. Lenses were then autoclaved. These lenses had a water content of 38%.

Example 22. Process for Making Polymacon Sandwich Colored Hydrogel Lens Body The process for making polymacon colored lens body was the same as that described in Example 21, except the desired ink containing the desired colored pigment was pad-printed onto the mold and lightly cured under visible light before lens formulation was injected into the same mold. After lens cured, the lens formulation was cast between two propylene molds and cured to obtain a colored hydrogel lens body according to the same manner as described above. Lenses were then stored in borate buffered saline at pH 7.40 and then autoclaved. In addition, for sandwiched color lens body, a clear coat was first pad-printed onto the same mold and lightly cured before the ink was pad-printed onto the mold. Then, the same curing and hydration process were performed to get the sandwiched color lens body stored in borate buffered saline and autoclaved.

Next, the surface modification and the surface contact angle hysteresis measurement of the aforementioned contact lenses and commercially available contact lenses are further performed.

Example 23. Process for Making Silicone Hydrogel Lens (Pure Vision) with Contact Angle Hysteresis <15°

A commercial silicone hydrogel lenses (Pure vision) were purchased. After immersing in de-ionized water for 30 minutes, 10 pieces of them were placed in glass vials containing 0.5% divinyl sulfone solution in water with pH at 8.5. They were heated at 45° C. for 1 hour. After that they were placed in glass vials containing 0.05% solution of copolymer from Example 4 and heated at 45° C. for 1 hour. Lenses were then rinsed in de-ionized water and then placed in a borate buffered saline at pH7.40 and then autoclaved. 10 lenses were then measured for dynamic contact angles and an average surface contact angle hysteresis value of 6.5° was obtained. As a comparison, the surface contact angle hysteresis of original Pure Vision lens was 57.2°.

Example 24. Process for Making Silicone Hydrogel Lens (Pure Vision) with Contact Angle Hysteresis <15°

After placing 10 pieces of commercially available Pure vision lenses in de-ionized water for an hour, they were place in glass vials containing 0.05% aqueous solution of copolymer of Example 5, and then the glass vials was heated at 45° C. for 1 hour. The lenses were then rinsed in water and then placed in glass vials containing 0.05% solution of copolymer from Example 4 and heated at 45° C. for 1 hour. The lenses were then rinsed in water and then placed in borate buffered saline at pH 7.40 and autoclaved. The lenses were then measured for dynamic contact angles and an average hysteresis value of 3.1° was obtained.

Example 25. Process for Making Rigid Gas Permeable Lens with Contact Angle Hysteresis <15°

10 pieces of commercially available rigid gas permeable lenses (Quantum II) are place in a glass vials containing 0.05% aqueous solution of copolymer of Example 3, and then the glass vials was heated at 45° C. for 2 hours. The lenses are then rinsed in water and then placed in borate buffered saline at pH 7.40 and autoclaved. The lenses are then measured for dynamic contact angles and an average surface contact angle hysteresis value of 7.5° is obtained. As a comparison, the surface contact angle hysteresis of original lens (Quantum II) was 55°.

Example 26. Process for Making a High Oxygen Permeable Silicone Hydrogel Lens with Contact Angle Hysteresis <15°

The silicone hydrogel lens body with high oxygen permeability of Example 17 was placed in a 0.1% aqueous solution of divinyl sulfone at pH 8.5 and at 45° C. for 1 hour. Then the lens body was placed in a 0.1% aqueous solution of copolymer of Example 10 at pH 9.50 and at 45° C. for an hour. After that, the lens body was placed in saline at 70° C. for an hour and then in borate buffered saline at pH7.30. Dynamic Contact angle measurements were performed for the lenses, and an average surface contact angle hysteresis of 6.6° was obtained.

Example 27. Process for Making a High Oxygen Permeable Silicone Hydrogel Lens with Contact Angle Hysteresis <15°

The silicone hydrogel lens body with high oxygen permeability of Example 17 was placed in a 0.05% aqueous solution of copolymer of Example 12 at pH 8.50 and at 45° C. for an hour. Then, the lens body was placed in a 0.05% aqueous solution of copolymer of Example 11 at pH 9.50 and at 45° C. for an hour. After that, the lens body was placed in saline at 70° C. for an hour and then in borate buffered saline at pH7.40 and autoclaved. Dynamic Contact angle measurements were performed for the lenses and an average surface contact angle hysteresis of 6.6° was obtained.

Example 28. Process for Making a High Oxygen Permeable Silicone Hydrogel Lens with Contact Angle Hysteresis <15°

The silicone hydrogel lens body with high oxygen permeability of Example 17 was placed in a 0.05% aqueous solution of copolymer of Example 14 at pH 8.50 and at 45° C. for an hour. Then, the lens body was placed in a 0.05% aqueous solution of copolymer of Example 11 at pH 9.50 and at 45° C. for an hour. After that, the lens body was placed in saline at 70° C. for an hour and then in borate buffered saline at pH7.40 and autoclaved. Dynamic Contact angle measurements were performed for the lenses and the average surface contact angle hysteresis was <5°.

Example 29. Process for Making a Middle Oxygen Permeable Silicone Hydrogel Lens with Contact Angle Hysteresis <15°

The silicone hydrogel lens body with middle oxygen permeability of Example 18 was placed in a 0.05% aqueous solution of copolymer of Example 7 at pH 8.50 and at 45° C. for an hour. Then, the lens body was placed in a 0.05% aqueous solution of copolymer of Example 11 at pH 9.50 and at 45° C. for an hour. After that, the lens body was placed in saline at 70° C. for an hour and then in borate buffered saline at pH7.40 and autoclaved. Dynamic contact angles were then measured and the average surface contact angle hysteresis was 1.4°.

Example 30. Process for Making Etafilcon a Hydrogel Lens with Contact Angle Hysteresis <15°

The etafilcon A hydrogel lens body of Example 19 was placed in a 0.05% aqueous solution of copolymer of Example 12 at pH 8.50 and at 45° C. for an hour. Then, the lens body was placed in a 0.05% aqueous solution of copolymer of Example 11 at pH 9.50 and at 45° C. for an hour. After that, the lens body was placed in saline at 70° C. for an hour and then in borate buffered saline at pH7.40 and autoclaved. Dynamic contact angles were then measured and the average surface contact angle hysteresis was 8.1°. The lenses were also much more lubricious than those not surface modified during the hydration process.

Example 31. Process for Making Etafilcon a Hydrogel Lens with Contact Angle Hysteresis <15°

The etafilcon A hydrogel lens body of Example 19 was placed in a 0.05% aqueous solution of copolymer of Example 7 at pH 8.50 and at 45° C. for an hour. Then, the lens body was placed in a 0.05% aqueous solution of copolymer of Example 4 at pH 9.50 and at 45° C. for an hour. After that, the lens body was placed in saline at 70° C. for an hour and then in borate buffered saline at pH7.40 and autoclaved. Dynamic contact angles were then measured and the average surface contact angle hysteresis was 6.5°. The lenses were also much more lubricious than those not surface modified during the hydration process.

Example 32. Process for Making Etafilcon a Sandwich Colored Hydrogel Contact Lens with Contact Angle Hysteresis <15°

The etafilcon A sandwich colored hydrogel lens body of Example 20 was placed in a 0.05% aqueous solution of copolymer of Example 12 at pH 8.50 and at 45° C. for an hour. Then, the lens body was placed in a 0.05% aqueous solution of copolymer of Example 11 at pH 9.50 and at 45° C. for an hour. After that, the lens body was placed in saline at 70° C. for an hour and then in borate buffered saline at pH7.40 and autoclaved. Dynamic contact angles were then measured and the average surface contact angle hysteresis was <15°. The lenses were also much more lubricious than those not surface modified during the hydration process.

Example 33. Process for Making Polymacon Sandwich Colored Hydrogel Contact Lens with Contact Angle Hysteresis <15°

The Polymacon sandwich colored hydrogel lens body of Example 22 was placed in a 0.05% aqueous solution of copolymer of Example 14 at pH 8.50 and at 45° C. for an hour. Then, the lens body was placed in a 0.05% aqueous solution of copolymer of Example 11 at pH 9.50 and at 45° C. for an hour. After that, the lens body was placed in saline at 70° C. for an hour and then in borate buffered saline at pH7.40 and autoclaved. Dynamic contact angles were then measured and the average surface contact angle hysteresis was <15°. The lenses were also much more lubricious than those not surface modified during the hydration process.

Next, the properties of the aforementioned surface-modified contact lenses and contact lenses without surface modification are further tested.

Example 34. Durability of Surface Modification Layer-Isopropanol Soaking Test 10 pieces of the contact lenses of Example 26 were placed individually into isopropanol for 4 hours, then they were place in de-ionized water, and then in borate buffered. Their dynamic contact angles were measured. The average surface contact angle hysteresis was 7.3, which is the same as before the isopropanol treatment, indicating that the contact lens maintains good wettability.

Example 35. Durability of Surface Modification Layer-Rubbing Test 10 pieces of the contact lenses of Example 28 were tested their dynamic contact angles, then were placed in buffered saline solution and rubbed 300 rounds. After that they were tested for dynamic contact angles again. The average surface contact angle hysteresis found was <5°, and the results are shown in FIG. 3A.

Example 36. Durability of Surface Modification Layer-Isopropanol Soaking Test 10 pieces of the contact lenses of Example 28 were tested their dynamic contact angles, then were placed in isopropanol for hours, during this period of time, the contact lenses expanded 30% and those species not crosslinked well with contact lenses would fall into solution. After that, the contact lenses were placed in water for washing, and then placed in buffered saline and were tested for dynamic contact angles again. The average surface contact angle hysteresis found was <5°, and the results are shown in FIG. 3B.

Example 37. Durability of Surface Modification Layer-Autoclaving Test 10 pieces of the contact lenses of Example 28 were tested their dynamic contact angles, then placed in buffered saline solution and autoclaved for 5 rounds. After that, they were tested for dynamic contact angles again. The average surface contact angle hysteresis found was <5°, and the results are shown in FIG. 3C.

Figures 3A, 3B, 3C:
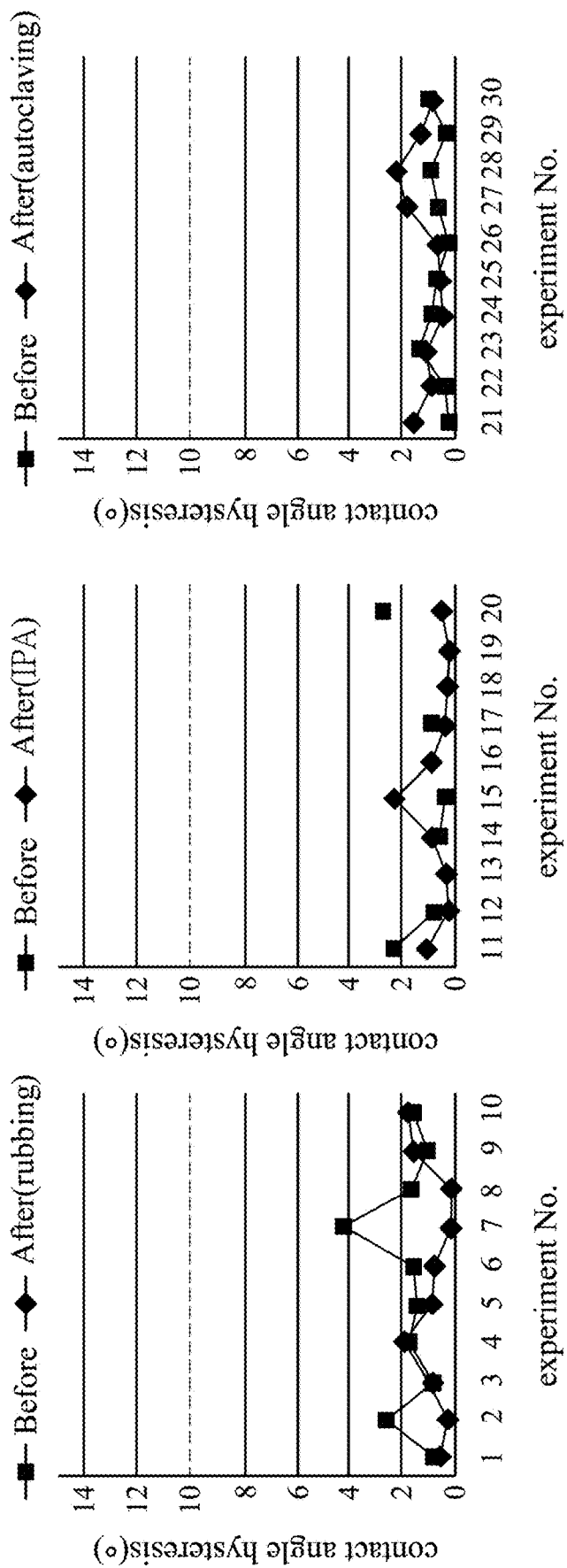
FIG. 3A is a schematic view illustrating the results of the durability-rubbing test of the surface modification layer according to some embodiments of the present invention.
FIG. 3B is a schematic view illustrating the durability-isopropanol soaking test of the surface modification layer according to some embodiments of the present invention.
FIG. 3C is a schematic view illustrating the durability-autoclave test of the surface modification layer according to some embodiments of the present invention.

As shown in FIG. 3A-3C, after the formation of the surface modification layer through the reaction of the silicone hydrogel lens body with the reactive hydrophilic polymer, the average surface contact angle hysteresis of the contact lens with the surface modification layer is <5°, indicating that the contact lens has good wettability. In addition, the surface contact angle hysteresis difference before and after the rubbing test, the isopropanol soaking test or the autoclaving test tests is small (still <5°), showing that the surface modification layer of the contact lens has good stability.

Example 38. Contact Angle Hysteresis Test of Colored Contact Lenses

The dynamic contact angle hysteresis of colored hydrogel contact lenses of Examples 20, 22, 32, and 33 were measured. Please refer to FIGS. 4A-4D. FIGS. 4A-4D are schematic views illustrating the colored hydrogel contact lens according to some embodiments of the present invention. The polymacon colored hydrogel contact lens 300 includes a transparent portion 310 and a colored portion 320. The polymacon sandwich colored hydrogel contact lens 400 includes a transparent portion 410 and a colored portion 420. The etafilcon A colored hydrogel contact lens 500 includes a transparent portion 510 and a colored portion 520. The etafilcon A sandwich colored hydrogel contact lens 600 includes a transparent portion 610 and a color portion 620.

Figure 5A:
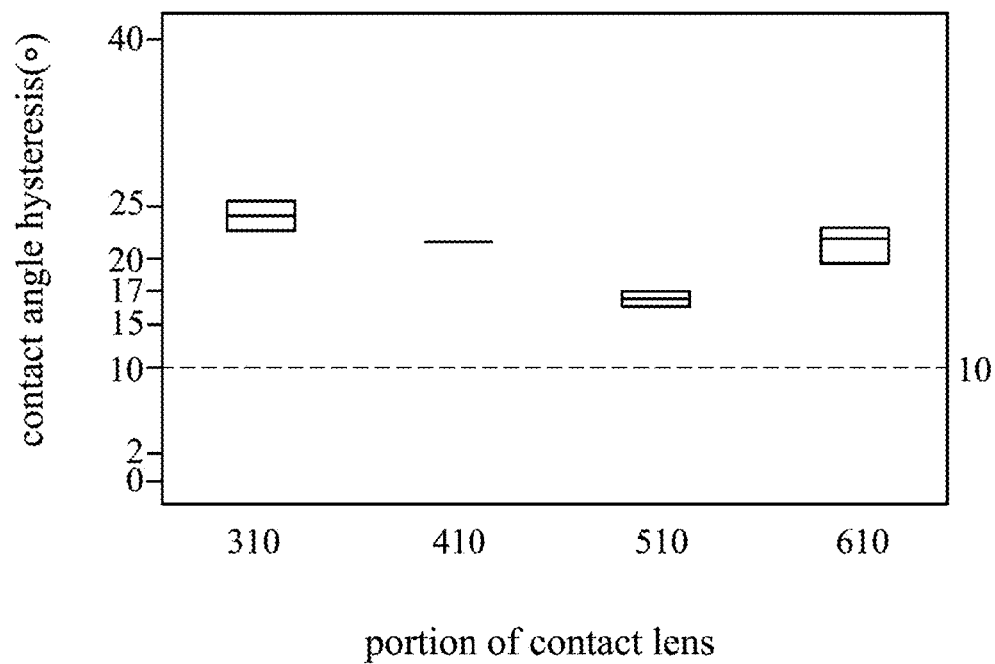
FIG. 5A is a schematic view illustrating the results of the measurement of the surface contact angle hysteresis of the transparent portion of the colored hydrogel contact lens without surface modification according to some embodiments of the present invention.

The surface contact angle hysteresis of the transparent portion of each colored hydrogel contact lens is measured, respectively. Please refer to FIGS. 5A and 5B. FIG. 5A shows the surface contact angle hysteresis measurement results of the transparent portion of the contact lenses without surface modification, and FIG. 5B shows that of the contact lenses with surface modification.

Figure 5B:
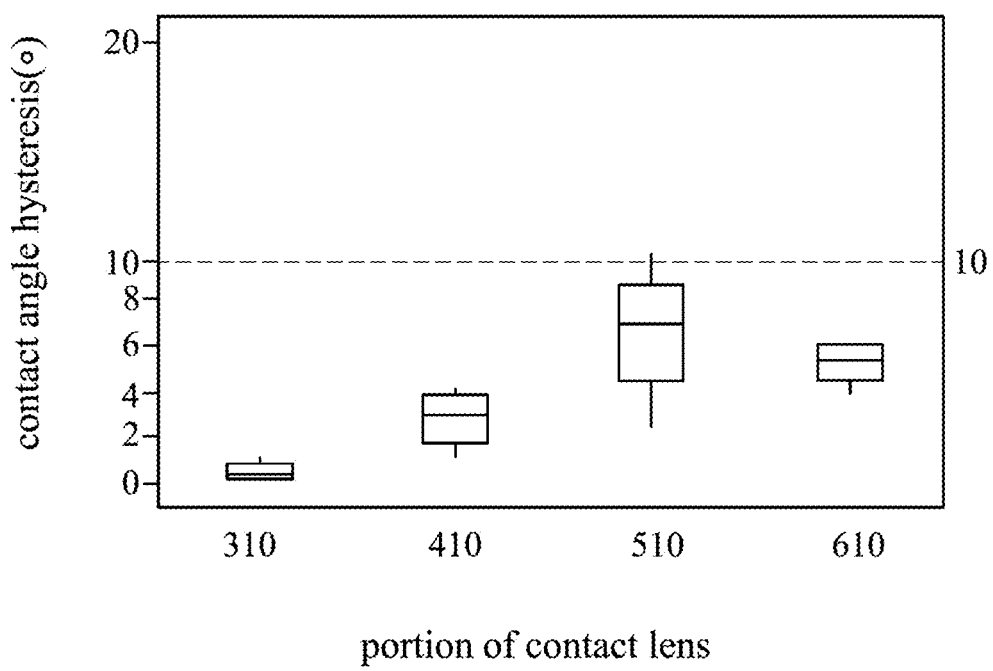
FIG. 5B is a schematic view illustrating the results of the measurement of the surface contact angle hysteresis of the transparent portion of the colored hydrogel surface-modified contact lens according to some embodiments of the present invention.

As shown in FIG. 5A and FIG. 5B, the surface contact angle hysteresis of the transparent portion of the four contact lenses without surface modification is 15-25°, and that of the four contact lenses with surface modification is reduced to less than 10°. It shows that the transparent portion of the colored hydrogel surface-modified contact lenses has good wettability.

Figure 6A:
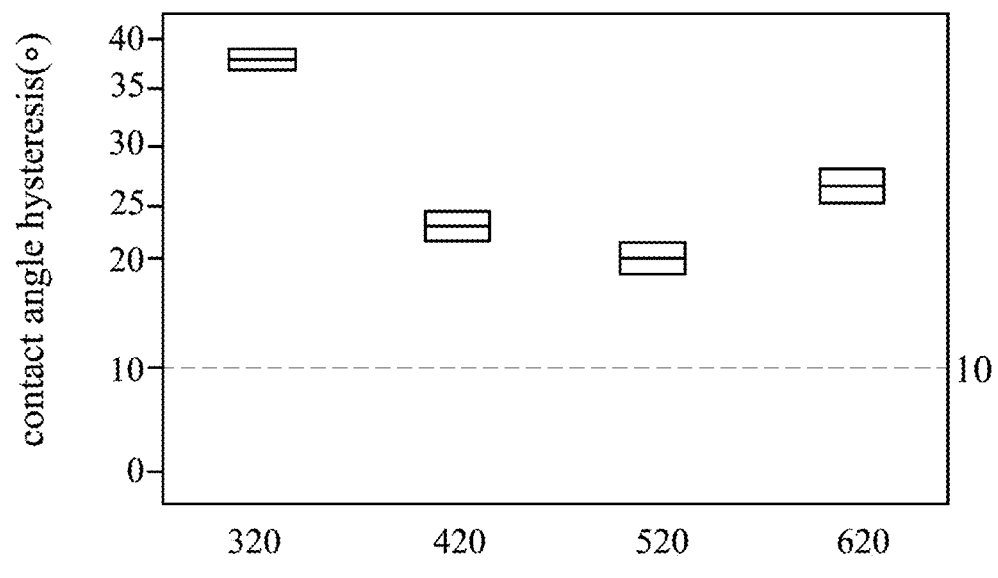
FIG. 6A is a schematic view illustrating the results of the measurement of the surface contact angle hysteresis of the colored portion of the colored hydrogel contact lens without surface modification according to some embodiments of the present invention.

Next, the surface contact angle hysteresis of the colored portion of each colored hydrogel contact lens is measured, respectively. Please refer to FIGS. 6A and 6B. FIG. 6A shows the surface contact angle hysteresis measurement results of the colored portion of the contact lenses without surface modification, and FIG. 6B shows that of the contact lenses with surface modification.

Figure 6B:
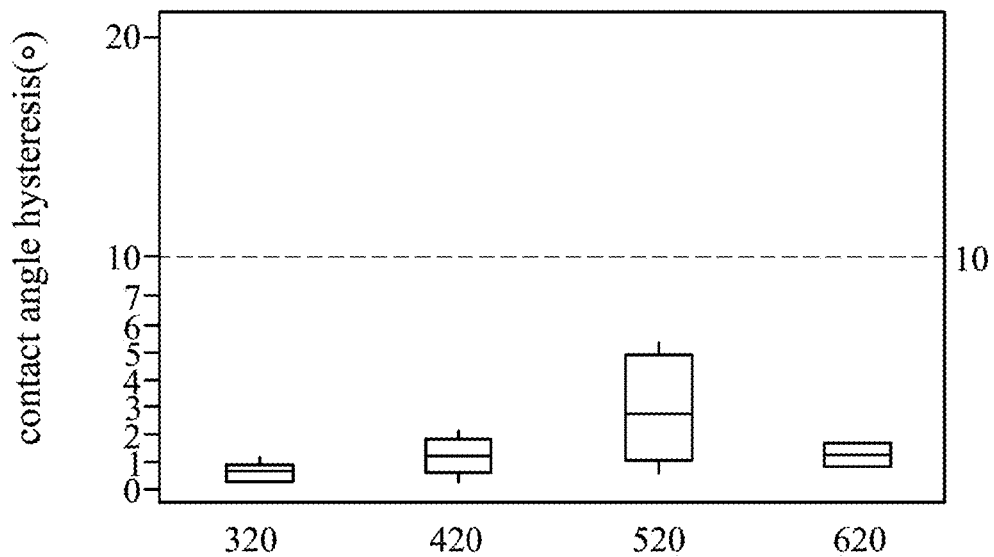
FIG. 6B is a schematic view illustrating the results of the measurement of the surface contact angle hysteresis of the colored portion of the colored hydrogel surface-modified contact lens according to some embodiments of the present invention.

As shown in FIG. 6A and FIG. 6B, the surface contact angle hysteresis of the colored portion of the four contact lenses without surface modification is 15-40°, and that of the four contact lenses with surface modification is reduced to less than 10°. It shows that the colored portion of the colored hydrogel surface-modified contact lenses has good wettability.

Example 39. Weight Loss Test of Hydrogel Contact Lenses

First, the surface-modified contact lens is placed in borate buffered saline at pH 7.40 for 2 hours. Then, each contact lens is taken out and the % weight loss is recorded over time. Similarly, the contact lens without surface modification is placed in borate buffered saline at pH 7.40 for 2 hours. Then, each contact lens is taken out and the % weight loss is recorded over time. In addition to the contact lenses of the present disclosure, some commercially available contact lenses are also tested under the same condition for comparison, and the results are shown in Table 4 below.

TABLE 4 wt % loss of hydrogel contact lenses

| Lens body | Contact lens | weight loss 10 minutes | 30 minutes |
|---|---|---|---|
| etafilcon A | The contact lens of Example 19 that doesn't have a surface modification layer | 9.06% | 24.57% |
| | The contact lens of Example 31 that has a surface modification layer | 8.53% | 22.26% |
| | AcuVue Moist (commercially available) | 8.91% | 23.53% |
| Polymacon | The contact lens of Example 21 that doesn't have a surface modification layer | 8.98% | 24.56% |
| | The contact lens of Example 33 that has a surface modification layer | 7.15% | 19.17% |
| | Hydron (commercially available) | 10.35% | 26.61% |
| Silicone hydrogel | The contact lens of Example 18 that doesn't have a surface modification layer | 10.00% | 26.33% |
| | The contact lens of Example 29 that has a surface modification layer | 8.17% | 21.37% |
| | Oasys (commercially available) | 8.70% | 22.28% |
| | Biofinity (commercially available) | 12.19% | 31.40% |
| | Clariti (commercially available) | 10.31% | 26.10% |
| | Dailies Total 1 (commercially available) | 9.18% | 22.38% |

As shown in Table 4, the contact lenses having a surface modification layer have a significantly lower weight loss. It shows that the dehydration rate of the surface-modified contact lens is less than that of the contact lens without surface modification. In addition, compared with the commercially available contact lenses, the surface-modified contact lens also has a lower dehydration rate.

Example 40. Clinical Evaluation

After receiving proper approval, clinical tests are performed on the contact lenses of Examples 17 and Examples 27. 19 subjects participated in this study, and the participants wear the contact lenses for at least 10 hours. It was found that there are 3 wearers wearing the contact lenses without surface modification got different degrees of lipid-like deposits, whereas there is no wearer wearing the surface-modified contact lenses got lipid-like deposits. It indicates that the surface-modified contact lenses have better wear comfort than the contact lenses without surface modification.

As described in the above embodiments of the present invention, the contact lenses disclosed herein have the following features. The reactive hydrophilic polymer can react with any lens body to form a surface modification layer. The lens body described herein includes rigid gas permeable lens body, non-silicone hydrogel lens body, and silicone hydrogel lens body. It should be understood that the hydration process is a step in the standard preparation process for manufacturing hydrogel lenses. A reactive hydrophilic polymer may be added in the hydration process to form a surface modification layer in the preparation of the hydrogel lens, such that it will not increase the cost of the surface modification of contact lenses. In addition, the surface-modified contact lens has a lower rate of dehydration than the same contact lens without surface modification. That is, the wearer of the surface-modified contact lens is less likely to feel the lens body dry.

On the other hand, the surface modification layer of the contact lens disclosed herein has good stability, and it has good compatibility with known contact lens care solution. It means that the "remaining" reactive functional groups of the reactive hydrophilic polymer in the surface modification layer do not react with the active species in the contact lens care solution, thereby avoiding the harm caused by wearing the contact lens. In addition, the surface modification of contact lenses can be completed before packaging the contact lens in the care solution. Thus, compared with the prior art in which the reactive hydrophilic polymer is packaged in the care solution to react with lens body, the surface-modified contact lens of the present invention can be stable in the care solution to avoid the possible adverse consequence caused by incomplete reaction.

In some embodiments of the present invention, the contact lens can be used for drug release purpose. For this purpose, the surface modification layer can be formed by reacting two reactive hydrophilic polymers with the lens body in different step. Alternatively, the surface modification layer can be formed by reacting a cross-linked hydrophilic polymer with the lens body to achieve accurate control of film thickness. Thus, the release rate of drug can be controlled by controlling the thickness of the surface modification layer.

In some embodiments of the present invention, the contact lens can be used for cosmetic purpose. For this purpose, the surface modification layer may provide a protective effect in addition to the surface lubricity. Specifically, the protective effect means that the colored pigments attached to the lens body will not be removed due to rubbing the contact lens. That is, when fabricating a sandwich colored contact lens, the process of forming a transparent modification layer on the surface of the lens body is replaced by forming the surface modification layer.

The molar ratio of the hydrophilic monomer portion and the bifunctional monomer portion of the reactive hydrophilic polymer affects the surface contact angle hysteresis of the surface-modified contact lens. As described above, when the molar ratio of the hydrophilic monomer portion and the bifunctional monomer portion is less than a certain value, certain technical effects of the present invention may not be achieved. Specifically, when the molar ratio of the hydrophilic monomer portion and the bifunctional monomer portion is less than a certain value, the amount of the portion derived from the hydrophilic monomer is too small, such that the hydrophilic functional group of the surface modification layer is insufficient. Therefore, the hydrophilicity of the surface of the contact lens is reduced, and thus the above excellent wettability is not obtained. When the molar ratio of the hydrophilic monomer portion and the bifunctional monomer portion is less than, for example, 2:1, the excellent wettability may not be obtained. According to some embodiments of the present invention, the molar ratio of the hydrophilic monomer portion and the bifunctional monomer portion is 25:1 to 3:1, for example, 14:1 to 3:1, 12:1 to 5:1 or 10:1 to 7:1.

In conclusion, the surface-modified contact lens disclosed herein has excellent surface wettability of surface contact angle hysteresis <15°, excellent surface lubricity, and low dehydration rate. Therefore, the wearer wearing such contact lens can feel more comfortable.

It should be understood that conventional non-silicone hydrogel contact lens is manufactured by the following steps. After curing the lens formulation to form the lens body, a cleaning process is performed with a suitable aqueous solution and at a suitable temperature. Next, the lens body is placed in a polypropylene container filled with buffered saline solution at about pH 7.4, then packaged and autoclaved. If it is the preparation of silicone hydrogel contact lenses rather than non-silicone hydrogel contact lenses, after curing the lens formulation to form the lens body, a cleaning process is performed with an organic solvent such as isopropanol at an appropriate temperature. Then, a cleaning process is performed with a suitable aqueous solution and at a suitable temperature. In some embodiments of the present invention, the surface modification is incorporated into the cleaning process of manufacturing contact lenses, so that it is not necessary to increase or change the manufacturing process of the contact lens. Furthermore, after the surface modification of the contact lens, the unreacted hydrophilic polymer is removed during the cleaning process. Thus, no unreacted hydrophilic polymer will be packaged in the care solution, solving the toxicity problem.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A surface-modified contact lens having a surface contact angle hysteresis of less than 15°, comprising:
    a lens body;
    a first surface modification layer disposed on a surface of the lens body, the first surface modification layer comprising a first reactive hydrophilic polymer,
    wherein the surface of the lens body has a first functional group or a second functional group, and the first reactive hydrophilic polymer has a third functional group or a fourth functional group;
    wherein a first covalent cross-link bond is formed between the surface of the lens body and the first surface modification layer, the first covalent cross-link bond being formed by reacting the first functional group or the second functional group of the surface of the lens body with the third functional group or the fourth functional group of the first reactive hydrophilic polymer;
    wherein the first functional group and the third functional group are selected from the group consisting of a vinyl group and an epoxy group;
    wherein the second functional group and the fourth functional group are selected from the group consisting of an amino group, a ammonium salt, a carboxylic acid group, a carboxylic salt, a hydroxyl group, a sulfonic acid group, and a sulfonic acid salt;
    wherein the first reactive hydrophilic polymer is formed by a copolymerization of a hydrophilic monomer and a bifunctional monomer,
        the hydrophilic monomer comprises at least one of N-vinyl pyrrolidone, N-vinyl-N-methyl acetamide, acrylamide, N-isopropyl acrylamide, N,N-diethyl acrylamide, and acryloyl morpholine,
        the bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride; and
        the first reactive hydrophilic polymer has a hydrophilic monomer portion derived from the hydrophilic monomer and a bifunctional monomer portion derived from the bifunctional monomer, and a molar ratio of the hydrophilic monomer portion to the bifunctional monomer portion is from 25:1 to 2:1;
    when the first covalent cross-link bond is formed from the first functional group of the surface of the lens body, the fourth functional group of the first reactive hydrophilic polymer is reacted with the first functional group to form the first covalent cross-link bond, and
    when the first covalent cross-link bond is formed from the second functional group of the surface of the lens body, the third functional group of the first reactive hydrophilic polymer is reacted with the second functional group to form the first covalent cross-link bond; and
    a second surface modification layer disposed on the first surface modification layer,
    wherein the second surface modification layer comprises a second reactive hydrophilic polymer, and a second covalent cross-link bond is formed between the first surface modification layer and the second surface modification layer.

2. The surface-modified contact lens of claim 1, wherein the first reactive hydrophilic polymer has an average molecular weight of greater than 50,000.

3. The surface-modified contact lens of claim 1, wherein the second reactive hydrophilic polymer has a fifth functional group or a sixth functional group, and the second covalent cross-link bond is formed by reacting the third functional group or the fourth functional group of the first reactive hydrophilic polymer with the fifth functional group or the sixth functional group of the second reactive hydrophilic polymer;
    wherein the fifth functional group is selected from the group comprising a vinyl group and an epoxy group;
    wherein the sixth functional group is selected from the group comprising an amino group, a ammonium salt, a carboxylic acid group, a carboxylic salt, a hydroxyl group, a sulfonic acid group, and a sulfonic acid salt;

when the second covalent cross-link bond is formed from the third functional group of the first reactive hydrophilic polymer, the sixth functional group of the second reactive hydrophilic polymer is reacted with the third functional group to form the second covalent cross-link bond, and when the second covalent cross-link bond is formed from the fourth functional group of the first reactive hydrophilic polymer, the fifth functional group of the second reactive hydrophilic polymer is reacted with the fourth functional group to form the second covalent cross-link bond.

4. The surface-modified contact lens of claim 3, wherein the second reactive hydrophilic polymer is formed by a copolymerization of a hydrophilic monomer and a bifunctional monomer, the hydrophilic monomer comprises at least one of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine, and the bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

5. The surface-modified contact lens of claim 4, wherein the second reactive hydrophilic polymer has a hydrophilic monomer portion derived from the hydrophilic monomer and a bifunctional monomer portion derived from the bifunctional monomer, and a molar ratio of the hydrophilic monomer portion to the bifunctional monomer portion is from 25:1 to 2:1.

6. The surface-modified contact lens of claim 3, wherein the second reactive hydrophilic polymer has an average molecular weight of greater than 50,000.

7. The surface-modified contact lens of claim 1, wherein the lens body is a rigid gas permeable lens body, a non-silicone hydrogel lens body, or a silicone hydrogel lens body.

8. The surface-modified contact lens of claim 1, wherein the lens body is a colored lens body.

9. The surface-modified contact lens of claim 8, wherein the colored lens body is a sandwiched color lens body.

10. A method of fabricating a surface-modified contact lens having a surface contact angle hysteresis of less than 15°, comprising:

reacting a lens body with a first reactive hydrophilic polymer at a temperature of 25-80° C. and a pH value of 7-13 to form a first surface modification layer on a surface of the lens body, after reacting the lens body with the first reactive hydrophilic polymer, reacting the lens body having the first surface modification layer thereon with a second reactive hydrophilic polymer at a temperature of 25-80° C. and a pH value of 7-13 to form a second surface modification layer on the first surface modification layer, wherein the surface of the lens body has a first functional group or a second functional group, and the first reactive hydrophilic polymer has a third functional group or a fourth functional group;

wherein a first covalent cross-link bond is formed between the surface of the lens body and the first surface modification layer, the first covalent cross-link bond being formed by reacting the first functional group or the second functional group of the surface of the lens body with the third functional group or the fourth functional group of the first reactive hydrophilic polymer;

wherein the first functional group and the third functional group are selected from the group consisting of a vinyl group and an epoxy group, wherein the second functional group and the fourth functional group are selected from the group consisting of an amino group, a ammonium salt, a carboxylic acid group, a carboxylic salt, a hydroxyl group, a sulfonic acid group, and a sulfonic acid salt;

wherein the first reactive hydrophilic polymer is formed by a copolymerization of a hydrophilic monomer and a bifunctional monomer, a molar ratio of the hydrophilic monomer to the bifunctional monomer is from 50:1 to 4:1, the hydrophilic monomer comprises at least one of N-vinyl pyrrolidone, N-vinyl-N-methyl acetamide, acrylamide, N-isopropyl acrylamide, N,N-diethyl acrylamide, and acryloyl morpholine, and the bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride;

when the first covalent cross-link bond is formed from the first functional group of the surface of the lens body, the fourth functional group of the first reactive hydrophilic polymer is reacted with the first functional group to form the first covalent cross-link bond, and when the first covalent cross-link bond is formed from the second functional group of the surface of the lens body, the third functional group of the first reactive hydrophilic polymer is reacted with the second functional group to form the first covalent cross-link bond.

11. The method of claim 10, before reacting the lens body with the first reactive hydrophilic polymer, further comprising: copolymerizing a hydrophilic monomer with a bifunctional monomer in an aqueous solution containing a water-soluble initiator to form the first reactive hydrophilic polymer.

12. The method of claim 10, wherein the second reactive hydrophilic polymer has a fifth functional group or a sixth functional group;

wherein a second covalent cross-link bond is formed between the first surface modification layer and the second surface modification layer, the second covalent cross-link bond being formed by reacting the third functional group or the fourth functional group of the first reactive hydrophilic polymer with the fifth functional group or the sixth functional group of the second reactive hydrophilic polymer;

wherein the fifth functional group is selected from the group consisting of a vinyl group and an epoxy group;

wherein the sixth functional group is selected from the group consisting of an amino group, a ammonium salt, a carboxylic acid group, a carboxylic salt, a hydroxyl group, a sulfonic acid group, and a sulfonic acid salt;

when the second covalent cross-link bond is formed from the third functional group of the first reactive hydrophilic polymer, the sixth functional group of the second reactive hydrophilic polymer is reacted with the third functional group to form the second covalent cross-link bond, and when the second covalent cross-link bond is formed from the fourth functional group of the first reactive hydrophilic polymer, the fifth functional group of the second reactive hydrophilic polymer is reacted with the fourth functional group to form the second covalent cross-link bond.

13. The method of claim 12, wherein the second reactive hydrophilic polymer is formed by a copolymerization of a hydrophilic monomer and a bifunctional monomer;

the hydrophilic monomer comprises at least one of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine, and the bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

14. The method of claim 10, before reacting the lens body with the first reactive hydrophilic polymer, further comprising: reacting the lens body with a vinyl-functionalizing reagent or an epoxy-functionalizing reagent to form the first functional group on the surface of the lens body.

15. The method of claim 10, before reacting the lens body with the first reactive hydrophilic polymer, further comprising: reacting the first reactive hydrophilic polymer with a vinyl-functionalizing reagent or an epoxy-functionalizing reagent to form the third functional group of the first reactive hydrophilic polymer.

16. The method of claim 10, wherein reacting the lens body with the first reactive hydrophilic polymer is performed during a hydration process of fabricating the surface-modified contact lens.

17. A method of fabricating a surface-modified contact lens having a surface contact angle hysteresis of less than 15°, comprising:

reacting a first reactive hydrophilic polymer with a second reactive hydrophilic polymer at a temperature of 25-80° C. and a pH value of 7-13 to form a cross-linked hydrophilic polymer; and reacting a lens body with the cross-linked hydrophilic polymer at a temperature of 25-80° C. and a pH value of 7-13 to form a surface modification layer on a surface of the lens body, wherein the surface of the lens body has a first functional group or a second functional group, the first reactive hydrophilic polymer has a third functional group or a fourth functional group, and the second reactive hydrophilic polymer has a fifth functional group or a sixth functional group;

wherein a first covalent cross-link bond is formed between the surface of the lens body and the surface modification layer, the first covalent cross-link bond being formed by reacting the first functional group or the second functional group of the surface of the lens body with the third functional group or the fourth functional group of the first reactive hydrophilic polymer;

wherein the cross-linked hydrophilic polymer has a second covalent cross-link bond, the second covalent cross-link bond being formed by reacting the third functional group or the fourth functional group of the first reactive hydrophilic polymer with the fifth functional group or the sixth functional group of the second reactive hydrophilic polymer;

wherein the first functional group, the third functional group, and the fifth functional group are selected from the group consisting of a vinyl group and an epoxy group;

wherein the second functional group, the fourth functional group, and the sixth functional group are selected from the group consisting of an amino group, a ammonium salt, a carboxylic acid group, a carboxylic salt, a hydroxyl group, a sulfonic acid group, and a sulfonic acid salt;

wherein the first reactive hydrophilic polymer is formed by a copolymerization of a first hydrophilic monomer and a first bifunctional monomer, a molar ratio of the first hydrophilic monomer to the first bifunctional monomer is from 50:1 to 4:1, the first hydrophilic monomer comprises at least one of N-vinyl pyrrolidone, N-vinyl-N-methyl acetamide, acrylamide, N-isopropyl acrylamide, N,N-diethyl acrylamide, and acryloyl morpholine, and the first bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride;

when the first covalent cross-link bond is formed from the first functional group of the surface of the lens body, the fourth functional group of the first reactive hydrophilic polymer is reacted with the first functional group to form the first covalent cross-link bond, and the fifth functional group of the second reactive hydrophilic polymer is reacted with the fourth functional group to form the second covalent cross-link bond, and when the first covalent cross-link bond is formed from the second functional group of the surface of the lens body, the third functional group of the first reactive hydrophilic polymer is reacted with the second functional group to form the first covalent cross-link bond, and the sixth functional group of the second reactive hydrophilic polymer is reacted with the third functional group to form the second covalent cross-link bond.

18. The method of claim 17, wherein the second reactive hydrophilic polymer is formed by a copolymerization of a second hydrophilic monomer and a second bifunctional monomer, the second hydrophilic monomer comprises at least one of N-vinyl pyrrolidone, N-vinyl-N-methyl acetamide, glyceryl methacrylate, acrylamide, N-isopropyl acrylamide, N,N-dimethyl acrylamide, N,N-diethyl acrylamide, and acryloyl morpholine, and the second bifunctional monomer comprises at least one of 2-hydroxyethyl methacrylate, acrylic acid, acrylic acid salt, methacrylic acid, methacrylic acid salt, maleic acid, maleic acid salt, fumaric acid, fumaric acid salt, 2-acrylamido-2-methyl propanesulfonic acid, 2-acrylamido-2-methyl propanesulfonic acid salt, glyceryl methacrylate, glycidyl methacrylate, 2-aminoethyl methacrylate hydrochloride, and N-(3-aminopropyl) methacrylamide hydrochloride.

19. The method of claim 18, before reacting the first reactive hydrophilic polymer with the second reactive hydrophilic polymer, further comprising:

reacting the first reactive hydrophilic polymer with a vinyl-functionalizing reagent or an epoxy-functionalizing reagent to form the third functional group of the first reactive hydrophilic polymer.

20. The method of claim 18, before reacting the lens body with the cross-linked hydrophilic polymer, further comprising: reacting the lens body with a vinyl-functionalizing reagent or an epoxy-functionalizing reagent to form the first functional group on the surface of the lens body.

21. The method of claim 17, before reacting the first reactive hydrophilic polymer with the second reactive hydrophilic polymer, further comprising:

copolymerizing the first hydrophilic monomer with the first bifunctional monomer in an aqueous solution containing a water-soluble initiator to form the first reactive hydrophilic polymer; and copolymerizing a second hydrophilic monomer with a second bifunctional monomer in an aqueous solution containing a water-soluble initiator to form the second reactive hydrophilic polymer, wherein a molar ratio of the second hydrophilic monomer to the second bifunctional monomer is from 50:1 to 4:1.

22. The method of claim 17, wherein reacting the lens body with the cross-linked hydrophilic polymer is performed during a hydration process of fabricating the surface-modified contact lens.

* * * * *